US012802962B2

(12) United States Patent
Lu et al.

(10) Patent No.: US 12,802,962 B2
(45) Date of Patent: Nov. 17, 2026

(54) MEMBRANE PREPARATION APPARATUS, ELECTRODE SHEET MANUFACTURING DEVICE, AND MEMBRANE PREPARATION METHOD

(71) Applicant: CONTEMPORARY AMPEREX TECHNOLOGY (HONG KONG) LIMITED, Hong Kong (CN)

(72) Inventors: Lei Lu, Ningde (CN); Changyuan Hu, Ningde (CN); Zheng Wang, Ningde (CN); Linzhen Yu, Ningde (CN); Yalong Wang, Ningde (CN); Shisong Li, Ningde (CN); Shengwu Zhang, Ningde (CN); Keqiang Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/029,483

(22) Filed: Jan. 17, 2025

(65) Prior Publication Data

US 2025/0174623 A1 May 29, 2025

Related U.S. Application Data

(63) Continuation of application No. PCT/CN2022/106723, filed on Jul. 20, 2022.

(51) Int. Cl.
*B29C 48/255* (2019.01)
*B29C 48/00* (2019.01)
(Continued)

(52) U.S. Cl.
CPC ....... *H01M 4/0411* (2013.01); *B29C 48/0021* (2019.02); *B29C 48/2552* (2019.02);
(Continued)

(58) Field of Classification Search
CPC ....... B29C 48/40; B29C 8/0021; B29C 48/08; B29C 48/2552; B29C 48/287;
(Continued)

(56) References Cited

U.S. PATENT DOCUMENTS

| | | | |
|---|---|---|---|
| 5,725,822 A | 3/1998 | Keller et al. | |
| 6,261,496 B1 * | 7/2001 | Duyckinck | C04B 35/636 419/36 |
| 6,355,194 B1 * | 3/2002 | Agur | B29B 13/10 430/106.3 |
| 2014/0210129 A1 | 7/2014 | Okafor et al. | |

FOREIGN PATENT DOCUMENTS

| | | |
|---|---|---|
| CN | 100517810 C | 7/2009 |
| CN | 108365193 A | 8/2018 |

(Continued)

OTHER PUBLICATIONS

The European Patent Office (EPO) The Extended European Search Report for Application No. 22951487.2 Jul. 21, 2025 9 Pages.

(Continued)

*Primary Examiner* — Monica A Huson
(74) *Attorney, Agent, or Firm* — ANOVA LAW GROUP, PLLC

(57) ABSTRACT

A membrane preparation apparatus includes a mixing mechanism, a first feeding mechanism, a second feeding mechanism and an extrusion die head, wherein the first feeding mechanism is used for adding, into the mixing mechanism, a powder mixture containing powder and a first binder; the second feeding mechanism is used for adding, into the mixing mechanism, a solution dissolved with a second binder; the mixing mechanism is used for mixing the powder mixture with the solution; and the extrusion die head is connected to a discharge end of the mixing mechanism and is used for forming a membrane in an extrusion molding mode.

19 Claims, 19 Drawing Sheets

(51) Int. Cl.

| | |
|---|---|
| ***B29C 48/285*** | (2019.01) |
| ***B29C 48/29*** | (2019.01) |
| ***B29C 48/40*** | (2019.01) |
| ***H01M 4/04*** | (2006.01) |
| *B29L 31/34* | (2006.01) |

(52) U.S. Cl.
CPC ............ *B29C 48/288* (2019.02); *B29C 48/29* (2019.02); *B29C 48/40* (2019.02); *B29L 2031/3468* (2013.01)

(58) Field of Classification Search
CPC ....... B29C 48/288; B29C 48/29; B29C 48/54; B29C 48/57; B29C 48/705; B29C 48/297; B29C 48/36; B29C 48/501; B29C 48/285; H01M 4/0411; H01M 4/13; H01M 4/139; H01M 4/36; H01M 4/62; B29L 2031/3468; Y02E 60/10
See application file for complete search history.

(56) References Cited

FOREIGN PATENT DOCUMENTS

| | | | |
|---|---|---|---|
| CN | 113937289 | A | 1/2022 |
| CN | 113964288 | A | 1/2022 |
| JP | 2001179808 | A | 7/2001 |
| JP | 2005026271 | A | 1/2005 |

OTHER PUBLICATIONS

The World Intellectual Property Organization (WIPO) International Search Report and Written Opinion for PCT/CN2022/106723 Mar. 24, 2023 10 Pages (including translation).
The China National Intellectual Property Administration (CNIPA) The Notification of Grant of Patent Right for Invention for Chinese Application 202280076681.2 Nov. 3, 2025 7 Pages (With Translation).

* cited by examiner

MEMBRANE PREPARATION APPARATUS, ELECTRODE SHEET MANUFACTURING DEVICE, AND MEMBRANE PREPARATION METHOD

CROSS-REFERENCE TO RELATED APPLICATION

This application is a continuation of International Application No. PCT/CN2022/106723, filed on Jul. 20, 2022, the entire content of which is incorporated herein by reference.

TECHNICAL FIELD

The present application relates to the technical field of battery manufacturing, and in particular to a membrane preparation apparatus, an electrode sheet manufacturing device, and a membrane preparation method.

BACKGROUND ART

Energy conservation and emission reduction are the key to sustainable development of the automotive industry. Electric vehicles have become an important part of the sustainable development of the automotive industry due to their advantages of energy conservation and environmental protection. For electric vehicles, the battery technology is an important factor for their development.

In battery production, how to improve the production quality and energy density of batteries is an urgent problem to be solved.

SUMMARY

The present application provides a membrane preparation apparatus, an electrode sheet manufacturing apparatus, and a membrane preparation method. The membrane preparation apparatus may effectively improve the production quality and energy density of a battery.

In a first aspect, the present application provides a membrane preparation apparatus, including a mixing mechanism, a first feeding mechanism, a second feeding mechanism and an extrusion die head, wherein the first feeding mechanism is used for adding, into the mixing mechanism, a powder mixture containing powder and a first binder; the second feeding mechanism is used for adding, into the mixing mechanism, a solution dissolved with a second binder; the mixing mechanism is used for mixing the powder mixture with the solution; and the extrusion die head is connected to a discharge end of the mixing mechanism and is used for forming a membrane in an extrusion molding mode.

The membrane preparation apparatus in the technical solution of the present application may achieve the purpose of directly mixing the powder mixture with the solvent and then performing extrusion molding to form the membrane. The first feeding mechanism and the second feeding mechanism are designed to facilitate the feeding of materials into the mixing mechanism in a classification mode. When the membrane preparation apparatus is applied to the preparation of an active substance layer membrane of an electrode sheet, the powder mixture, which contains electrode active substance powder and a fibrotic first binder that is not easy to dissolve in a solvent or poor in solubility in the solvent, may be added into the mixing mechanism by means of the first feeding mechanism, the solution dissolved with the second binder may be added into the mixing mechanism by means of the second feeding mechanism, the mixing mechanism mixes the powder mixture with the solution, the first-type binder is fiberized to form a net structure, so as to bind and fix raw materials such as electrode active substance in fiber grids of the binder to form an active substance mixture of a rib-net structure, and the solution dissolved with the second-type binder effectively increases the flexibility and cohesiveness of the active substance mixture, thereby forming a clustered active substance mixture with certain viscosity and plasticity, and then extrusion molding is performed on the active substance mixture by means of the extrusion die head, so as to form an active substance membrane.

On one hand, in the technical solution of the present application, the fibrotic first binder which is not easy to dissolve in a solvent or an aqueous solution is mixed with the powder in advance to form the powder mixture, thereby avoiding the problem that the first binder aggregates and is unlikely to disperse due to poor solubility after being directly mixed into the solution, thus improving the dispersion uniformity of the first binder in the active substance mixture; on the other hand, in the technical solution of the present application, the second-type binder having a bonding effect is dissolved in the solvent to form a solution, and then the solution is mixed with the powder mixture, so that the dispersion uniformity of the second binder in the active substance mixture can be effectively ensured, and the flexible bonding effect of the second-type binder on the active substance mixture is sufficiently exerted; and in another aspect, compared with a solvent-free pure dry-method membrane preparation process, in the technical solution of the present application, the second feeding mechanism is configured to add the solution into the mixture, thereby effectively improving the structural looseness of the active substance mixture, and improving the plasticity and ductility of the active substance mixture, therefore the compactibility of the membrane is improved, which in turn improves the volume proportion of active substances of the electrode sheet; and moreover, due to the addition of the solution, the requirement for the first binder can be effectively reduced, thereby facilitating to improve the content proportion of the active substance, and the energy density of the battery is effectively improved by means of improving the proportion of the active substances. In general, the membrane preparation apparatus can effectively improve the mixing uniformity of the active substance mixture and the distribution uniformity of various components, is beneficial to improving the proportion of the active substances, and effectively improving the energy density of the battery while effectively improving the production quality of the electrode sheet.

According to some embodiments of the present application, the extrusion die head is directly connected with the discharge end of the mixing mechanism.

In the above technical solution, the extrusion die head is directly installed on the discharge end of the mixing mechanism, and the entire membrane preparation apparatus integrates mixing with extrusion molding, so that the structure integration is high. Compared with a structure in which material mixing is separated from extrusion molding, the technical solution of the present application effectively shortens a material transfer time and a repeated material shearing and conveying time, thereby simplifying the production process, and improving the production efficiency of the battery electrode sheet; and meanwhile, the requirements for production equipment are effectively reduced, the manufacturing cost is saved, the practicability is high, and the economic benefit is prominent.

According to some embodiments of the present application, the mixing mechanism is a twin-screw machine.

In the above technical solution, the mixing mechanism is a twin-screw machine, and the twin-screw machine performs sufficient mixing, shearing and kneading on the powder mixture and the solution, thereby achieving the purpose of uniformly mixing the powder mixture and the solution in the twin-screw machine; and moreover, the twin-screw machine can play conveyance and pressure establishment roles on mixed materials during a material mixing process, so as to provide extrusion power for extrusion molding of the membrane, so that the uniformly mixed mixture can be formed into the membrane by the extrusion die head in the extrusion molding mode.

According to some embodiments of the present application, a screw of the twin-screw machine is formed by alternately arranging an internal mixing rotor element and a thread conveying element.

In the above technical solution, the screw of the twin-screw machine is formed by alternately arranging the internal mixing rotor element and the thread conveying element, the thread conveying element conveys the materials, and the internal mixing rotor element sufficiently disperses, shears and kneads the materials, so as to sufficiently balance the shearing, mixing and conveying capabilities of the membrane preparation apparatus; meanwhile, the shear acting force of the internal mixing rotor element is relatively mild, so that the risk of crushing the morphology of active electrode particles due to an over-shearing effect can be effectively reduced, thereby reducing the risk of gas production of the battery and the risk of low first efficiency of the battery; and moreover, the mild shearing force of the internal mixing rotor element can enable the binder to generate fibrosis without damaging the fiber structure, thereby effectively reducing the risk of failure of the binder resulting from the over-shearing effect.

According to some embodiments of the present application, the width of a screw edge of the internal mixing rotor element is d, the outer diameter of the screw is D, $0.02\ D \le d \le 0.15\ D$, and in some embodiments $0.04\ D \le d \le 0.1\ D$.

During the use process of the internal mixing rotor element, a pair of elements in a mirror-image relationship is often used in cooperation, an accommodating space for accommodating the materials is formed between the screw edges of the internal mixing rotor element in an enclosing mode, and the materials in the accommodating space are mainly sheared and kneaded in the accommodating space and a slit between the screw edge and an inner wall of a cylinder of the twin-screw machine, so that the materials are uniformly mixed.

If the width of the screw edge of the internal mixing rotor element is too large, the free volume of the accommodating space is relatively small, meanwhile, channel resistance formed by a space between the screw edge and the cylindrical wall is increased, the moving speed of the materials due to the shearing action is reduced, and the number of times for shearing the materials is correspondingly reduced, easily resulting in insufficient mixing of the materials; and on the contrary, if the width of the screw edge of the internal mixing rotor element is too small, the free volume of the accommodating space is increased, the materials are easily accumulated in the accommodating space, meanwhile, the shearing rate is increased when the materials pass through the space between the screw edge and the cylindrical wall, and the number of shearing times is correspondingly increased, thereby easily resulting in the problems of excessive shearing of the materials and damage to the binder structure.

In the technical solution of the present application, the ratio of the width of the screw edge of the internal mixing rotor element to the outer diameter of the screw is set between 0.02 and 0.15, which can effectively ensure that the materials are sufficiently and uniformly mixed while avoiding excessive shearing, thereby effectively ensuring the production quality of the membrane, and thus effectively ensuring the production quality of the battery.

According to some embodiments of the present application, the helical angle of the screw edge of the internal mixing rotor element is θ, $90° \le \theta \le 150°$, and in some embodiments, $110° \le \theta \le 130°$.

In the above technical solution, the helical angle of the screw edge of the internal mixing rotor element is greater than or equal to 90° and less than or equal to 150°. If the helical angle is too small, too few materials are accommodated in the space formed between the screw edges, and the shearing and mixing time of the materials by the internal mixing rotor element is too short, which is not conducive to the sufficient mixing of the materials; and if the helical angle is too large, too many materials are accommodated in the space formed between the screw edges, so that the materials close to a thread element cannot be updated along with continuous forward push of the materials, as a result, the materials with high solid content are easily deposited in the internal mixing rotor element, and the materials with low solid content flow forwards from the outer layer of the internal mixing rotor element, easily resulting in uneven mixing of the materials as well. By means of the technical solution of the present application, sufficient and uniform mixing of the materials can be effectively ensured.

According to some embodiments of the present application, the thread conveying element includes a first thread conveying element and a second thread conveying element, the outer diameter of the screw is D, the screw pitch of the first thread conveying element is L1, the screw pitch of the second thread conveying element is L2, $0.8\ D \le L1 \le 1.2\ D$, and $0.5\ D \le L2 \le 0.8\ D$.

In the above technical solution, the screw includes the first thread conveying element and the second thread conveying element, which have different screw pitches, the thread conveying elements having different screw pitches play a role in adjusting the conveying speed of the materials, so that the materials can be conveyed at a variable speed, the materials can be smoothly conveyed and sufficiently mixed and sheared in the twin-screw machine, and finally become denser under the pressure establishment effect of the screw.

In addition, the screw pitch affects the volume of a thread groove, thereby affecting the extrusion amount and the shearing and mixing degree of the materials; if the screw pitch is too small, the extrusion amount is insufficient, which is not conducive to improving the production efficiency of the electrode sheet; and if the screw pitch is too large, the volume of the thread groove is too large, therefore too many materials are accumulated between the thread grooves, so that the materials in the thread grooves cannot be updated in time, thus affecting the uniformity of dispersing and mixing the materials. The screw pitch of the second thread element is set between 0.5 D and 0.8 D, and the screw pitch of the first thread conveying element is set between 0.8 D and 1.2 D, so that the extrusion amount of the screw and the mixing uniformity of the materials can be effectively considered.

According to some embodiments of the present application, $0.9\ D \le L1 \le 1.1\ D$, $0.6\ D \le L2 \le 0.7\ D$.

In the above technical solution, the screw pitch of the second thread element is set between 0.5 D and 0.8 D, and the screw pitch of the first thread conveying element is set between 0.8 D and 1.2 D, so that the mixing uniformity of the materials can be further improved while the extrusion amount of the screw is increased.

According to some embodiments of the present application, the screw includes a plurality of groups of internal mixing rotor conveying assemblies, each group of internal mixing rotor conveying assemblies includes two internal mixing rotor elements and one second thread conveying element, which are sequentially disposed in the conveying direction of the screw, the second thread conveying element is directly connected with the internal mixing rotor elements, and the two internal mixing rotor elements are in mirror symmetry connection with each other along the axis of the screw.

In the above technical solution, the two internal mixing rotor elements are in mirror symmetry connection with each other along the axis of the screw, so as to shear and knead the materials. However, the own conveying capability of the internal mixing rotor element is relatively weak, in order to prevent the materials from being deposited in the internal mixing rotor element, or even lock the screw, in the technical solution of the present application, one second thread conveying element is directly connected to the downstream of the internal mixing rotor element in the internal mixing rotor conveying assembly, so that the materials sheared and kneaded by the internal mixing rotor element can be conveyed in time. Therefore, the structure of the overall internal mixing rotor conveying assembly ensures the smooth conveyance of the materials while ensuring the sufficient shearing and mixing of the materials.

According to some embodiments of the present application, the thread conveying element further includes a third thread conveying element, the screw pitch of the third thread conveying element is L3, 0.2 D≤L3≤0.5 D, and in some embodiments, 0.3 D≤L3≤0.45 D.

In the above technical solution, the thread conveying element includes the third thread conveying element, the screw pitch of the third thread conveying element is less than those of the first thread conveying element and the second thread conveying element, the third thread conveying element can further reduce the conveying speed of the materials and further promote the pressure establishment of the materials, so that the materials are denser, the interface fusion performance is better, and the compacted materials can be conveniently and evenly sent out from the twin-screw machine, which is conducive to further ensuring the uniformity of the subsequent extrusion molding of the membrane.

The screw pitch of the third thread conveying element is set between 0.2 D and 0.5 D, which is conducive to ensuring a sufficient and uniform conveying effect on the materials while ensuring the conveying amount of the materials, thereby ensuring the compactness and uniformity of the materials.

According to some embodiments of the present application, the screw includes a first thread conveying element, an internal mixing rotor conveying assembly, a first thread conveying element, an internal mixing rotor conveying assembly, a first thread conveying element, a second thread conveying element and a third thread conveying element, which are sequentially disposed in the conveying direction of the screw.

In the above technical solution, the first thread conveying element with a longer screw pitch is disposed at the upstream of the screw, and the conveying efficiency thereof is high, thereby being conducive to conveying the materials to the internal mixing rotor element at the downstream; a middle section of the screw is alternately provided with the internal mixing rotor conveying assembly and the first thread conveying element, thereby ensuring that the materials can be smoothly conveyed to the tail end of the screw while ensuring the sufficient shearing and mixing of the materials; the tail end of the screw is sequentially provided with the first thread conveying element, the second thread conveying element and the third thread conveying element, which have gradually decreasing screw pitches, so as to effectively reduce the conveying speed of the materials and play a sufficient pressure establishment role on the materials, so that the materials are denser and more uniform; and finally, the third thread conveying element uniformly sends out the compacted materials from the twin-screw machine, which is conducive to further ensuring the uniformity of the subsequent extrusion molding of the membrane.

According to some embodiments of the present application, the depth of the thread groove of the thread conveying element is H, the outer diameter of the screw is D, 0.1 D≤H≤0.15 D, and in some embodiments 0.12 D≤H≤0.14 D.

In the above technical solution, the depth of the thread groove of the thread conveying element is set between 0.1 D and 0.15 D, if the depth of the thread groove is too large, the structural strength of the screw may be affected, such that the screw is prone to a shearing anomaly under a relatively large torsion, therefore if the depth of the thread groove is too large, the rotating speed and the treatment capacity of the screw are limited; and if the depth of the thread groove is too small, the conveying capability and the extrusion amount of the screw are reduced, and the shearing force of the screw on the materials is prone to be too large, thereby increasing the risk of damaging the fiber structure of the binder. In the technical solution of the present application, the depth of the thread groove of the thread conveying element can be compatible with the structural strength, the treatment capacity and the conveying capacity of the screw, and the risk of structural damage to the binder caused by the too large shearing force is effectively reduced, thereby effectively ensuring the manufacturing quality of the electrode sheet.

According to some embodiments of the present application, the twin-screw machine includes a cylinder and a screw, the screw is rotatably disposed in the cylinder, a gap between an outer circumferential surface of the screw and an inner wall of the cylinder is L4, 0.1 mm≤L4≤0.6 mm, and in some embodiments, 0.3 mm≤L4≤0.5 mm.

If the gap between the screw and the cylinder is too large, the reverse flow and leakage phenomena of the materials are serious, easily resulting in a fluctuation in the extrusion pressure, thereby affecting the extrusion amount of the screw; moreover, due to the increase in the back flow and leakage phenomena, the powder mixture and the solution cannot be sufficiently infiltrated and mixed, resulting in aggravated friction of the materials, which leads to overheat of the materials, thereby leading to an irreversible damage to the materials such as the binder; however, if the gap between the screw and the cylinder is too small, a tiny deformation of the screw during a material extrusion process may result in friction between the screw and the inner wall of the cylinder, on one hand, metal chippings are easily introduced, thus bringing risks to the service life and safety of the battery, and on the other hand, the mechanical friction also affects the service life of the twin-screw machine, and increases the equipment cost.

By means of designing and limiting the gap between the screw and the cylinder between 0.1 mm and 0.6 mm, the back flow and leakage phenomena can be effectively reduced, thereby improving the sufficiency of infiltration and mixing of the powder mixture and the solution, thus reducing the risk of damaging the properties of the materials due to excessive heat generated by the friction of the materials, and effectively ensuring the stability of the properties of the materials, so that the production quality of the battery is improved; and meanwhile, the risk of friction between the screw and the cylinder is effectively reduced, so that the service life of the twin-screw machine is effectively ensured, and metal chippings are effectively prevented from being doped into the materials.

According to some embodiments of the present application, in the conveying direction of the screw, the first feeding mechanism is located at the upstream of the second feeding mechanism.

In the above technical solution, the first feeding mechanism is disposed at the upstream of the second feeding mechanism, after the powder mixture enters the mixing mechanism, the powder mixture is gradually infiltrated and uniformly mixed with the solution during the conveying process of the screw, thereby effectively ensuring the contact sufficiency of the powder mixture and the solution, and thus further improving the mixing uniformity of the materials of the electrode sheet.

According to some embodiments of the present application, the first feeding mechanism is a weightlessness scale.

In the above technical solution, the weightlessness scale is selected as the first feeding mechanism, the weightlessness scale can realize high-precision continuous quantitative feeding in a static weighing mode, thereby effectively ensuring the reliability, accuracy and stability of feeding the powder mixture; and the proportion of the powder mixture and the solution can be conveniently and stably controlled, thereby ensuring the uniformity and consistency of mixing the materials, and thus effectively improving the production quality of the battery.

According to some embodiments of the present application, the second feeding mechanism is a metering pump.

In the above technical solution, the metering pump is selected as the second feeding mechanism, the metering pump can convey the solution at a stable flow rate, thereby effectively ensuring the reliability, accuracy and stability of feeding the solution; and the proportion of the powder mixture and the solution can be conveniently and stably controlled, thereby ensuring the uniformity and consistency of mixing the materials, and thus effectively improving the production quality of the battery.

According to some embodiments of the present application, the extrusion die head includes a die head body and a flow equalizing plate, the die head body is provided with a feed port, a discharge port and a material cavity for communicating the feed port with the discharge port, the flow equalizing plate is disposed in the material cavity, the flow equalizing plate divides the material cavity into a first cavity communicating with the feed port and a second cavity communicating with the discharge port, the flow equalizing plate is provided with a plurality of through holes, and the plurality of through holes communicate with the first cavity and the second cavity.

In the above technical solution, the flow equalizing plate is disposed in the extrusion die head, the design of the flow equalizing plate effectively adjusts the extrusion speed of the extrusion die head in the length direction of the discharge port, so that the extrusion speed of the materials in the length direction of the discharge port is more uniform, thereby improving the uniformity of extruding the materials in the length direction of the discharge port.

According to some embodiments of the present application, in the length direction of the discharge port, the diameters of the through holes gradually increase from the middle of the flow equalizing plate to two sides.

In the above technical solution, by means of limiting the change in the diameter of the through hole, the flow resistance of the materials is adjusted, so that the materials can be blended from the middle to the two sides in the length direction of the discharge port, thereby improving the uniformity of extruding the materials in the length direction of the discharge port.

According to some embodiments of the present application, the material cavity includes a flow splitting region, a buffer region and a pressure establishment region, the flow splitting region, the buffer region and the pressure establishment region are sequentially arranged in a direction pointing from the feed port to the discharge port, the sectional area of the flow splitting region gradually increases from the feed port to the buffer region, and the sectional area of the pressure establishment region gradually decreases from the buffer region to the discharge port.

In the above technical solution, the material cavity is divided into the flow splitting region, the buffer region and the pressure establishment region, the flow splitting region splits the materials entering the material cavity from the feed port, so that the materials sufficiently fill the material cavity, and especially can be spread in the length direction of the discharge port, and the pressure establishment region is used for compacting the materials in the material cavity again, so that the structural uniformity and continuity of the extruded membrane are effectively ensured.

According to some embodiments of the present application, the flow equalizing plate is disposed in the pressure establishment region and/or the buffer region.

In the above technical solution, the flow equalizing plate is disposed in the pressure establishment region and/or the buffer region, which is conducive to further ensuring the uniformity of extruding the materials in the length direction of the discharge port.

In a second aspect, the present application provides an electrode sheet manufacturing device, including: the membrane preparation apparatus according to any one of the above solutions, wherein the membrane preparation apparatus is used for forming a membrane in an extrusion molding mode; and a compounding apparatus, disposed at the downstream of the membrane preparation apparatus, wherein the compounding apparatus is used for compounding a base material with the membrane to form an electrode sheet.

In the above technical solution, the electrode sheet manufacturing device includes the membrane preparation apparatus and the compounding apparatus disposed at the downstream of the membrane preparation apparatus, the membrane preparation apparatus directly and uniformly mixes the powder mixture and the solution, which are used for forming the active substance layer, and performs extrusion molding to form an active substance membrane, and the compounding apparatus compounds the active substance membrane with the base material to prepare the electrode sheet. The overall electrode sheet manufacturing device has high integration, and effectively improves the production quality and production efficiency of the electrode sheet.

In a third aspect, the present application provides a membrane preparation method, including: mixing a first binder with powder to form a powder mixture; dissolving a second binder in a solvent to form a solution; mixing the powder mixture with the solution to form an active substance mixture; and performing extrusion molding on the active substance mixture to form a membrane.

BRIEF DESCRIPTION OF DRAWINGS

In order to illustrate the technical solutions in the embodiments of the present application more clearly, brief description will be made below to the drawings required in the embodiments of the present application. Apparently, the drawings described below are some embodiments of the present application only, and other drawings could be obtained based on these drawings by those ordinary skilled in the art without creative efforts.

Figure 1:
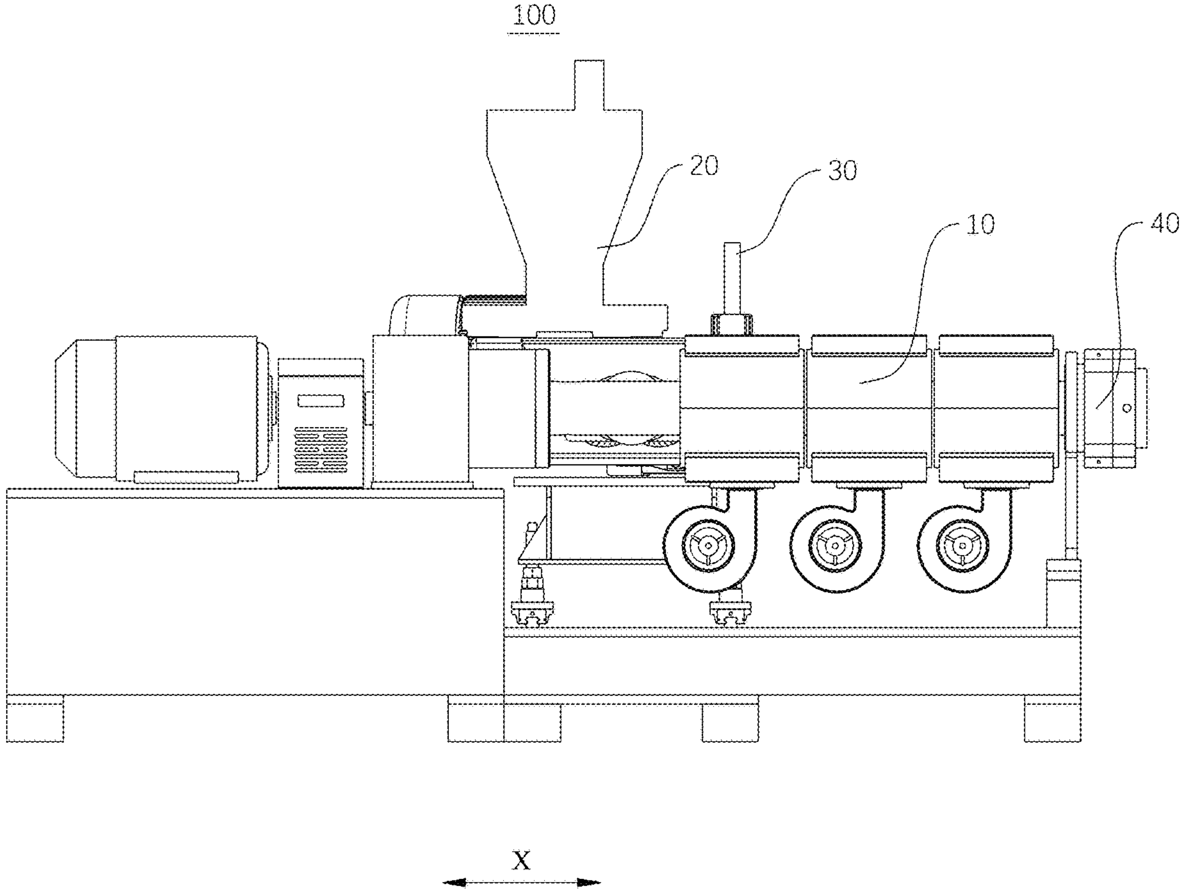
FIG. 1 is a front view of the structure of a membrane preparation apparatus provided in some embodiments of the present application.

In the drawings, the drawings are not necessarily drawn to actual scale.

Description of Reference Signs: 1000—electrode sheet manufacturing device; 100—membrane preparation apparatus; 10—mixing mechanism; 11—screw; 111—first thread conveying element; 112—second thread conveying element; 113—third thread conveying element; 114—internal mixing rotor element; 1141—screw edge; 12—cylinder; 20—first feeding mechanism; 21—stock bin; 22—stirring motor; 23—stirring paddle; 24—feeding motor; 25—feeding screw; 26—first weighing platform; 30—second feeding mechanism; 31—storage silo; 32—metering hopper; 33—second weighing platform; 34—pump body; 40—extrusion die head; 41—die head body; 42—feed port; 43—discharge port; 44—material cavity; 441—flow splitting region; 442—buffer region; 443—pressure establishment region; 45—flow equalizing plate; 451—through hole; 200—compounding apparatus; 210—unwinding mechanism; 220—rolling mechanism; 221—first compression roller; 230—thinning mechanism; 231—second compression roller; 300—edge trimming apparatus; 310—cutting mechanism; 311—base; 312—hobbing cutter; 313—first guide rail; 314—first size measurement member; 320—removal mechanism; 321—blade; 322—second guide rail; 323—second size measurement member; 400—drying apparatus; 500—active substance membrane; 600—base material.

DETAILED DESCRIPTION OF EMBODIMENTS

In order to make the objectives, technical solutions and advantages of the embodiments of the present application clearer, the technical solutions in the embodiments of the present application will be described clearly and completely below in conjunction with the drawings in the embodiments of the present application. Apparently, the described embodiments are part of the embodiments of the present application, not all of them. Components in the embodiments of the present application, typically described and shown in the drawings, may be arranged and designed in various different configurations.

Therefore, detailed descriptions of the embodiments of the present application provided in the drawings below are not intended to limit the protection scope of the present application, but only to represent the selected embodiments of the present application. All other embodiments, obtained by those ordinary skilled in the art based on the embodiments of the present application without creative efforts, shall fall within the protection scope of the present application.

The following describes the embodiments of the technical solutions of the present application with reference to the drawings. The following embodiments are only used to illustrate the technical solutions of the present application, and therefore are only examples and cannot be used to limit the protection scope of the present application.

Unless otherwise defined, all technological and scientific terms used herein have the same meanings as those commonly understood by those skilled in the art to which the present application belongs. The terms used herein are merely for the purpose of describing specific embodiments, but are not intended to limit the present application. The terms “include” and “have” and any variations thereof in the specification and claims of the present application as well as the brief description of the drawings described above are intended to cover non-exclusive inclusions.

In the description of the embodiments of the present application, the terms “first”, “second”, and the like are only used to distinguish different objects and cannot be understood as indicating or implying relative importance or implying the quantity, specific order, or primary and secondary relationship of the indicated technical features. In the description of the embodiments of the present application, “a plurality of” means two or more, unless otherwise specified.

The phrase “embodiment” referred to herein means that specific features, structures, or characteristics described in conjunction with the embodiment may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described herein may be combined with another embodiment.

In the description of the embodiments of the present application, the term “a plurality of” means two (inclusive) or more.

In the description of the embodiments of the present application, orientation or positional relationships indicated by the technical terms “center”, “longitudinal”, “transverse”, “length”, “width”, “thickness”, “upper”, “lower”, “front”, “back”, “left”, “right”, “vertical”, “horizontal”, “top”, “bottom”, “internal”, “external”, “clockwise”, “counterclockwise”, “axial direction”, “radial direction”, “circumferential direction”, or the like are based on orientation or positional relationships shown in the drawings, and are merely for ease of describing the present application and simplifying the description, but do not indicate or imply that an apparatus or an element referred to must have a specific orientation or be constructed and operated in a specific orientation, and therefore cannot be understood as a limitation on the embodiments of the present application.

In the description of the embodiments of the present application, unless otherwise explicitly specified and defined, the technical terms “set”, “mounted”, “connected”, “connection”, “fixed”, and the like should be understood broadly. For example, the term “connection” may be a fixed connection, a detachable connection, an integration, a mechanical connection, an electrical connection, a signal connection, direct connection, an indirect connection through a medium, or an internal communication of two elements, or an interaction between two elements. Those of ordinary skill in the art may appreciate the specific meanings of the foregoing terms in the embodiments of the present application to specific circumstances.

In the embodiments of the present application, the same reference signs represent the same components, and for simplicity, detailed descriptions of the same components are omitted in different embodiments. It should be understood that dimensions such as thickness, length and width of various components and dimensions such as overall thickness, length and width of integrated apparatuses in the embodiments of the present application shown in the drawings are merely illustrative examples and should not constitute any limitations on the present application.

An electrode sheet mentioned in the present application is an important component of a battery cell, the battery cell includes an electrode assembly, and the electrode assembly is composed of a positive electrode sheet, a negative electrode sheet and an isolating membrane. The battery cell operates mainly depending on the movement of metal ions between the positive electrode sheet and the negative electrode sheet. The electrode sheet includes a current collector (that is, a base material mentioned below) and an active substance layer, specifically, the positive electrode sheet includes a positive electrode current collector and a positive electrode active substance layer, the positive electrode active substance layer is coated on a surface of the positive electrode current collector, the positive electrode current collector which is not coated with the positive electrode active substance layer protrudes from the positive electrode current collector which is coated with the positive electrode active substance layer, and the positive electrode current collector which is not coated with the positive electrode active substance layer may be used as a positive electrode tab. Taking a lithium ion battery as an example, the positive electrode current collector may be made of aluminum, and the positive electrode active substance may be lithium cobalt oxide, lithium iron phosphate, ternary lithium or lithium manganate, etc. The negative electrode sheet includes a negative electrode current collector and a negative electrode active substance layer, the negative electrode active substance layer is coated on a surface of the negative electrode current collector, the negative electrode current collector which is not coated with the negative electrode active substance layer protrudes from the negative electrode current collector which is coated with the negative electrode active substance layer, and the negative electrode current collector which is not coated with the negative electrode active substance layer may be used as a negative electrode tab. The negative electrode current collector may be made of copper, and the negative electrode active substance may be carbon or silicon, etc. In order to ensure that no fuse occurs when large current passes through, there are a plurality of positive electrode tabs, which are stacked together, and there are a plurality of negative electrode tabs, which are stacked together.

A membrane mentioned in the present application refers to a strip-shaped active substance layer membrane, which is formed after an active substance mixture is extruded and shaped, and the active substance layer membrane is attached to a current collector to form an electrode sheet.

In the present application, a battery cell applicable to the prepared electrode sheet may include a lithium ion secondary battery, a lithium ion primary battery, a lithium sulfur battery, a sodium lithium ion battery, a sodium ion battery or a magnesium ion battery, and the like, which is not limited in the embodiments of the present application.

The development of the battery production technology needs to advance from multiple aspects, for example, energy density, production efficiency, production quality, etc.

A wet-method coating process is used in the traditional preparation of the electrode sheet, in which materials such as a binder, an active substance and a conductive agent are prepared into a sizing agent, the sizing agent is coated on the surface of a current collector in a wet method, and the current collector is placed in a high-temperature oven to evaporate a solvent, so as to obtain the required electrode sheet. The preparation of the electrode sheet in the wet-method coating process has a lot of defects: (1) the solid content of the sizing agent is low, the use amount of the solvent is large, the drying energy consumption is high, the equipment investment is large, and the solvent is toxic and is not environmentally friendly; (2) during the drying process of the electrode sheet, the binder floats upwards, resulting in the problem of uneven distribution of components of the active substance layer, which seriously restricts the performance of the battery; and (3) due to the problems of easy cracking and the like, the preparation requirement of an electrode sheet with a relatively thick active substance layer cannot be met, and the improvement space in the energy density of the battery is small.

In order to avoid the defects in the preparation of the electrode sheet by using the wet-method coating process, the electrode sheet of the battery is prepared by using a dry-method process in some related arts, in the dry-method process, after an electrode active substance, a conductive agent and a dry-method binder are uniformly mixed, there is no need to add a large amount of solvent, a net structure is formed by means of the fibrosis of the dry-method binder, so as to bind and fix the electrode active substance and the conductive agent in the fiber grids of the binder to prepare an electrode sheet membrane with a self-supporting structure, and then the electrode sheet membrane is compounded with a current collector to prepare a battery electrode sheet. Compared with the mode of preparing the electrode sheet by using the traditional wet-method coating process, the process can effectively reduce, to a theoretical extent, the drying energy consumption and period, reduce the environmental pollution, easily realize the manufacturing of thick electrode sheets, and reduce the risk of cracking of the electrode sheets; meanwhile, the binder can be prevented from floating, so that the distribution uniformity of the components of the active substance layer is improved; and as a whole, the production efficiency and the production quality of the electrode sheet can be effectively improved, and it is conducive to improving the energy density of the battery.

However, the inventor discovers that the active substance layer membrane prepared by using the dry-method process still has the problems of poor structural uniformity and uneven component distribution, and has the defect of low energy density.

The inventor of the present application discovers after analyzing the causes that: (1) the binder is easy to agglomerate, and has the problem of uneven dispersion, so that the structure of the active substance mixture is relatively loose, and the distribution of the components is not uniform; (2) since there is no solvent in the active substance mixture, the slippage of particles is difficult during a compaction process, resulting in poor plasticity and ductility of the active substance mixture, and it is difficult to realize high-density compaction, thereby affecting the improvement in the energy density thereof; (3) since there is no solvent, the slippage of the particles is difficult, the friction force between the particles is large, so that the active particles are easy to break the fiberized binder structure during the production process of the active substance membrane and the electrode sheet, thereby reducing the utilization efficiency of the binder, therefore an excessive amount of fibrotic binder needs to be added during the preparation of the active substance mixture, so a to exert the effect of the binder as much as possible, the proportion of an active substance is reduced by the excessively large content of the binder, which affects the improvement in the energy density as well.

Based on the above causes, in order to solve the problems of poor structural uniformity and low energy density of an extruded membrane, the inventor of the present application provides, by means of deep researches, a membrane preparation apparatus. The membrane preparation apparatus includes a mixing mechanism, a first feeding mechanism, a second feeding mechanism and an extrusion die head, wherein the first feeding mechanism is used for adding, into the mixing mechanism, a powder mixture containing powder and a first binder; the second feeding mechanism is used for adding, into the mixing mechanism, a solution dissolved with a second binder; the mixing mechanism is used for mixing the powder mixture with the solution; and the extrusion die head is connected to a discharge end of the mixing mechanism and is used for forming a membrane in an extrusion molding mode.

When the membrane preparation apparatus is applied to the preparation of an active substance layer membrane of an electrode sheet, the powder mixture, which contains electrode active substance powder and a fibrotic first binder that is not easy to dissolve in a solvent or poor in solubility in the solvent, may be added into the mixing mechanism by means of the first feeding mechanism, the solution dissolved with the second binder may be added into the mixing mechanism by means of the second feeding mechanism, the mixing mechanism mixes the powder mixture with the solution, the first-type binder is fiberized to form a net structure, so as to bind and fix raw materials such as the electrode active substance in fiber grids of the binder to form an active substance mixture of a rib-net structure, and the solution dissolved with the second-type binder effectively increases the flexibility and cohesiveness of the active substance mixture, thereby forming a clustered active substance mixture with certain viscosity and plasticity, and then extrusion molding is performed on the active substance mixture by means of the extrusion die head, so as to form the active substance membrane.

In a first aspect, in the technical solution of the present application, the fibrotic first binder which is not easy to dissolve in a solvent or an aqueous solution is mixed with the powder in advance to form the powder mixture, thereby avoiding the problem that the first binder aggregates and is unlikely to disperse due to poor solubility after being directly mixed into the solution, thus improving the dispersion uniformity of the first binder in the active substance mixture; in a second aspect, in the technical solution of the present application, the second-type binder having a bonding effect is dissolved in the solvent to form the solution, and then the solution is mixed with the powder mixture, so that the dispersion uniformity of the second binder in the active substance mixture can be effectively ensured, and the flexible bonding effect of the second-type binder on the active substance mixture is sufficiently exerted; and in a third aspect, compared with the pure dry-method membrane preparation process, in the technical solution of the present application, the second feeding mechanism is configured to add the solution into the mixture, thereby effectively improving the structural looseness of the active substance mixture, and improving the plasticity and ductility of the active substance mixture, therefore the compactibility of the membrane is improved, which in turn improves the volume proportion of active substances of the electrode sheet; and moreover, due to the addition of the solution, the requirement for the first binder can be effectively reduced, thereby facilitating to improve the content proportion of the active substance, and the energy density of the battery is effectively improved by means of improving the proportion of the active substances. In general, the membrane preparation apparatus in the present application can effectively improve the mixing uniformity of the active substance mixture and the distribution uniformity of various components, is beneficial to improving the proportion of the active substances, and effectively improving the energy density of the battery while effectively improving the production quality of the electrode sheet.

The membrane preparation apparatus 100 disclosed in the embodiments of the present application may be applied to, but is not limited to, an electrode sheet manufacturing device, and may also be applied to a preparation process for preparing various plastic membranes or extruded strip-shaped materials in other fields. For ease of description, it is taken as an example for illustration that the membrane preparation apparatus is used for preparing an active substance membrane.

Referring to FIG. 1, FIG. 1 is a front view of the structure of a membrane preparation apparatus provided in some embodiments of the present application. The membrane preparation apparatus 100 provided in some embodiments of the present application includes a mixing mechanism 10, a first feeding mechanism 20, a second feeding mechanism 30 and an extrusion die head 40, wherein the first feeding mechanism 20 is used for adding, into the mixing mechanism 10, a powder mixture containing powder and a first binder; the second feeding mechanism 30 is used for adding, into the mixing mechanism 10, a solution dissolved with a second binder; the mixing mechanism 10 is used for mixing the powder mixture with the solution; and the extrusion die head 40 is connected to a discharge end of the mixing mechanism 10 and is used for forming a membrane in an extrusion molding mode.

The mixing mechanism 10 is used for mixing the powder mixture with the solution, and the mixing mechanism 10 has a plurality of implementation structures, for example, the mixing mechanism 10 may be a kneader, an internal mixer, or the like. It can be understood that, when the mixing mechanism 10 is a mixing apparatus such as a kneader and an internal mixer, the membrane preparation apparatus 100 further includes an extrusion unit, and the extrusion unit provides extrusion power for extruding the powder mixture from the extrusion die head 40. The extrusion unit may be a split structure disposed between the mixing mechanism 10 and the extrusion die head 40, for example, the extrusion unit may include a cavity and an extrusion power source, the cavity communicates with the mixing mechanism 10 and the extrusion die head 40, the active substance mixture mixed by the mixing mechanism 10 enters the cavity, and the extrusion power source applies an extrusion force to the active substance mixture, so that the active substance mixture is shaped and extruded out from the extrusion die head 40. The extrusion power source may be a conventional power provision mechanism such as a hydraulic telescopic structure.

Of course, in some embodiments, the mixing mechanism 10 may integrate mixing, conveying and extruding, that is, the mixing mechanism 10 provides extrusion power for the active substance mixture while sufficiently mixing the active substance mixture.

The first feeding mechanism 20 may have a plurality of implementation structures, and the first feeding mechanism 20 may include a conventional powder mixing mechanism 10, such as a double-planetary stirrer, a horizontal double-shaft spiral ribbon mixer, a double-helix conical mixer, an inclined intensive mixer and the like, so as to sufficiently and uniformly stir the first binder and the powder (the powder is electrode active substance powder in the present embodiment), and then add the same into the mixing mechanism 10. Of course, the first feeding mechanism 20 may further include a weighing structure to control the feeding amount of the powder mixture added into the mixing mechanism 10. In the present embodiment, the structure of the first feeding mechanism 20 is not uniquely defined, as long as the powder mixture can be fed.

Similarly, the second feeding mechanism 30 may also have a plurality of implementation structures, as long as the solution can be fed.

In the embodiments of the present application, the powder refers to powder used for preparing the active substance layer, and the powder may include an electrode active substance, a conductive agent and the like. For example, when the electrode sheet is an electrode sheet of a lithium battery, a positive electrode active substance may include one or more of the following materials: a lithium-containing phosphate of an olivine structure, a lithium transition metal oxide, and respective modified compounds thereof. However, the present application is not limited to these materials, and other traditional materials that may be used as the positive electrode active substance of the battery may also be used.

A negative electrode active substance may include one or more of the following materials: a carbon material, a silicon material, lithium, a lithium alloy material, and the like, wherein a carbon-containing material may include natural graphite, artificial graphite, mesocarbon microbeads, hard carbon, soft carbon, and the like; the silicon material may include siliceous oxide, silicon nanowires, composite silicon carbon materials and the like; and the lithium and the lithium alloy material may include at least one a titanium oxide, lithium, a lithium alloy, and materials capable of forming the lithium alloy.

The conductive agent may include one or more of superconducting carbon, acetylene black, carbon black, Ketjen black, carbon dots, carbon nanotubes, graphene, and carbon nanofibers. In the present embodiment, the first binder may be a fibrotic binder which is not easy to dissolve in the solution, so as to increase the structural strength of the active substance mixture, so that the active substance mixture forms the rib-net structure. In the embodiment of the present application, the type of the first binder is not uniquely defined, for example, the first binder may be a fluorine-containing fibrotic polymer material, such as polytetrafluoroethylene.

In the present embodiment, the second binder is mainly used for increasing the flexibility and cohesiveness of the active substance mixture, and in the embodiment of the present application, the type of the second binder is not uniquely defined, for example, the second binder may be polyvinylidene fluoride or the like.

The solvent forming the solution may include micromolecular alcohols or esters, for example, the solvent may be N-methylpyrrolidone.

The extrusion die head 40 is used for shaping the extrusion shape of the active substance mixture, so that the active substance mixture is formed into a strip-shaped membrane structure of a three-dimensional structure in an extrusion molding mode. In the embodiments of the present application, after the powder mixture and the solution are mixed in the mixing mechanism 10, the active substance mixture is formed, and the active substance mixture is extruded out by the extrusion die head 40 to form an active substance membrane 500.

In the present embodiment, the structure type of the extrusion die head 40 is not particularly defined, and the extrusion die head 40 may employ a conventional plunger structure, a clothes hanger structure and a fishtail structure, so long as the active substance mixture is uniformly extruded to meet the size requirement of the membrane.

The membrane preparation apparatus 100 provided in the technical solution of the present application may achieve the purpose of directly mixing the powder mixture with the solvent and then performing extrusion molding to form the membrane; and meanwhile, the first feeding mechanism 20 and the second feeding mechanism 30 are provided to facilitate the feeding of the mixing mechanism 10 in a classification mode. When the membrane preparation apparatus 100 is applied to the preparation of the active substance layer membrane of the electrode sheet, the powder mixture, which contains electrode active substance powder and the fibrotic first binder that is not easy to dissolve in the solvent or poor in solubility in the solvent, may be added into the mixing mechanism 10 by means of the first feeding mechanism 20, the solution dissolved with the second binder may be added into the mixing mechanism 10 by means of the second feeding mechanism 30, the mixing mechanism 10 mixes the powder mixture with the solution, the first-type binder is fiberized to form a net structure, so as to bind and fix raw materials such as the electrode active substance in fiber grids of the binder to form an active substance mixture of a rib-net structure, and the solution dissolved with the second-type binder effectively increases the flexibility and cohesiveness of the active substance mixture, thereby forming a clustered active substance mixture with certain viscosity and plasticity, and then extrusion molding is performed on the active substance mixture by means of the extrusion die head 40, so as to form the active substance membrane 500. In a first aspect, by means of the technical solution of the present application, it is possible to avoid the problem that the fibrotic first binder aggregates and is unlikely to disperse due to poor solubility after being directly mixed into the solution, thus improving the dispersion uniformity of the first binder in the active substance mixture; in a second aspect, the technical solution of the present application makes it possible to effectively ensure the sufficient dissoluvability of the second-type binder having a bonding effect, thereby ensuring the dispersion uniformity of the second-type binder in the active substance mixture; and in a third aspect, compared with a pure dry-method membrane preparation process, in the technical solution of the present application, the second feeding mechanism 30 is configured to add the solution, thereby effectively improving the structural looseness of the active substance mixture, and improving the plasticity and ductility of the active substance mixture. In general, the membrane preparation apparatus 100 in the present application can effectively improve the mixing uniformity of the active substance mixture and the distribution uniformity of various components, thereby improving the structural uniformity of the membrane and the distribution uniformity of the components, and thus effectively improving the production quality of the electrode sheet.

According to some embodiments of the present application, as shown in FIG. 1, the extrusion die head 40 is directly connected with the discharge end of the mixing mechanism 10.

The extrusion die head 40 is directly connected to the discharge end of the mixing mechanism 10, and then the mixing mechanism 10 completes mixing the active substance mixture and provides extrusion power for extruding the active substance mixture. In the present embodiment, the mixing mechanism 10 may be a single-screw extruder, a twin-screw extruder, and other mechanisms.

The extrusion die head 40 is directly installed on the discharge end of the mixing mechanism 10, and the entire membrane preparation apparatus 100 integrates mixing with extrusion molding, so that the structure integration is high. Compared with a structure in which material mixing is separated from extrusion molding, the technical solution of the present application effectively shortens a material transfer time and a repeated material shearing and conveying time, thereby simplifying the production process, and improving the production efficiency of the battery electrode sheet; and meanwhile, the requirements for production equipment are effectively reduced, the manufacturing cost is saved, the practicability is high, and the economic benefit is prominent.

Figure 2:
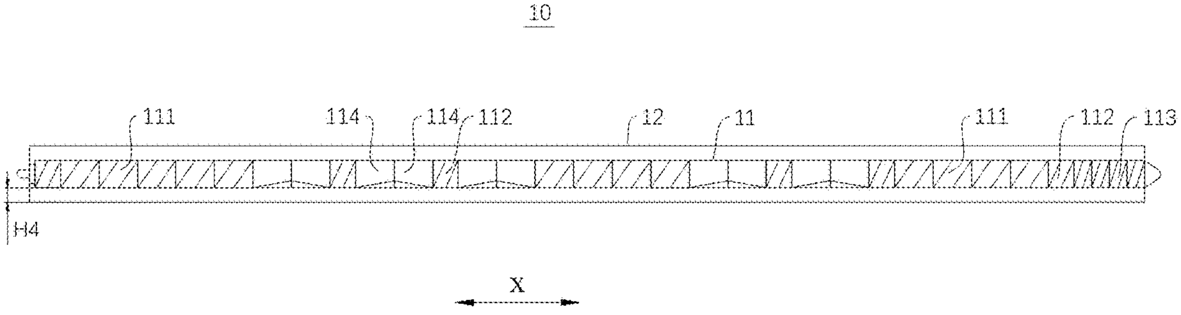
FIG. 2 is a front view of a screw structure of a twin-screw machine provided in some embodiments of the present application.

According to some embodiments of the present application, referring further to FIG. 2, FIG. 2 is a front view of a screw structure of a twin-screw machine provided in some embodiments of the present application, wherein the mixing mechanism 10 is a twin-screw machine.

The twin-screw machine is also referred to as a twin-screw extruder, and the twin-screw machine mainly includes an extrusion system and a transmission system. The extrusion system mainly includes two parallel screws 11 and a cylinder 12, and the material is sheared in the cylinder 12 and moves by means of the same-direction or different-direction rotation of the two screws 11. The transmission system mainly functions to drive the two screws 11 to rotate, and provide a torque and a torsional moment, which are required by the two screws during an extrusion process, and the transmission system is usually composed of an electric motor, a speed reducer, a bearing and the like. The screw 11 of the twin-screw machine may be of a modular construction, and the screw 11 of the twin-screw machine may include one or more of structures such as a thread conveying element, an internal mixing rotor element, a kneading element, a toothed disc, and the like, so as to achieve the effects of conveying, dispersing, shearing, kneading, pressure establishment and the like of the active substance mixture. The main function of the thread conveying element is to perform conveyance, pressure establishment and the like on the active substance mixture in the twin-screw machine, and the main functions of the internal mixing rotor element, the kneading element, the toothed disc and the like are to perform shearing, kneading and the like on the active substance mixture in the twin-screw machine. The structures such as the thread conveying element, the internal mixing rotor element, the kneading element, the toothed disc and the like are conventional composition structures for constituting the screw 11 of the twin-screw machine, and thus the basic structure thereof is not repeatedly described in the present embodiment.

The twin-screw machine in the embodiments of the present application may employ a conventional commercially available twin-screw extruder, and thus the detailed structural compositions of the twin-screw extruder are no longer repeatedly described in the present embodiment. The structure of the screw 11 is not uniquely defined, as long as the preparation of materials with certain strength and flexibility can be met.

In the above technical solution, the mixing mechanism 10 is a twin-screw machine, and the twin-screw machine performs sufficient mixing, shearing and kneading on the powder mixture and the solution, thereby achieving the purpose of uniformly mixing the powder mixture and the solution in the twin-screw machine, and ensuring the sufficient mixing and infiltration of the powder and the solution; and meanwhile, the mixing mechanism realizes the fibrosis of the first binder, so that the active substance mixture can form a clustered structure with certain viscosity, plasticity and ductility, thereby further ensuring the structural uniformity of the active substance mixture and the distribution uniformity of the components. Moreover, the twin-screw machine can play conveyance and pressure establishment roles on the active substance mixture during the process of mixing the active substance mixture, and provide extrusion power for the extrusion molding of the membrane, so that the uniformly mixed mixture can be formed into the membrane by the extrusion die head 40 in the extrusion molding mode.

According to some embodiments of the present application, the screw 11 of the twin-screw machine is formed by alternately arranging an internal mixing rotor element 114 and a thread conveying element.

As described above, the screw 11 of the twin-screw machine may be of a modular construction, the screw 11 of the twin-screw machine may include one or more of structures such as the thread conveying element, the internal mixing rotor element 114, the kneading element, the toothed disc and the like, and the selection, number, arrangement and combination order and the like of different elements play a crucial role in mixing and shearing different materials.

In the present embodiment, the screw 11 is formed by alternately arranging the internal mixing rotor element 114 and the thread conveying element, the thread conveying element conveys the active substance mixture, and the internal mixing rotor element 114 sufficiently disperses, shears and kneads the active substance mixture, so as to sufficiently balance the shearing, mixing and conveying capabilities of the membrane preparation apparatus 100.

The inventor of the present application discovers that, the shear acting force of the internal mixing rotor element 114 is relatively mild, so that the fibrosis of the first binder can be ensured without damaging the fiber structure, thereby effectively reducing the risk of failure of the first binder due to an over-shearing effect, and thus effectively ensuring the structural toughness of the active substance mixture; and meanwhile, the risk of crushing the morphology of active electrode particles due to the over-shearing effect can be effectively reduced, thereby reducing the risk of gas production of the battery and the risk of low first efficiency of the battery, and moreover, the energy density thereof is effectively ensured.

Figure 3:
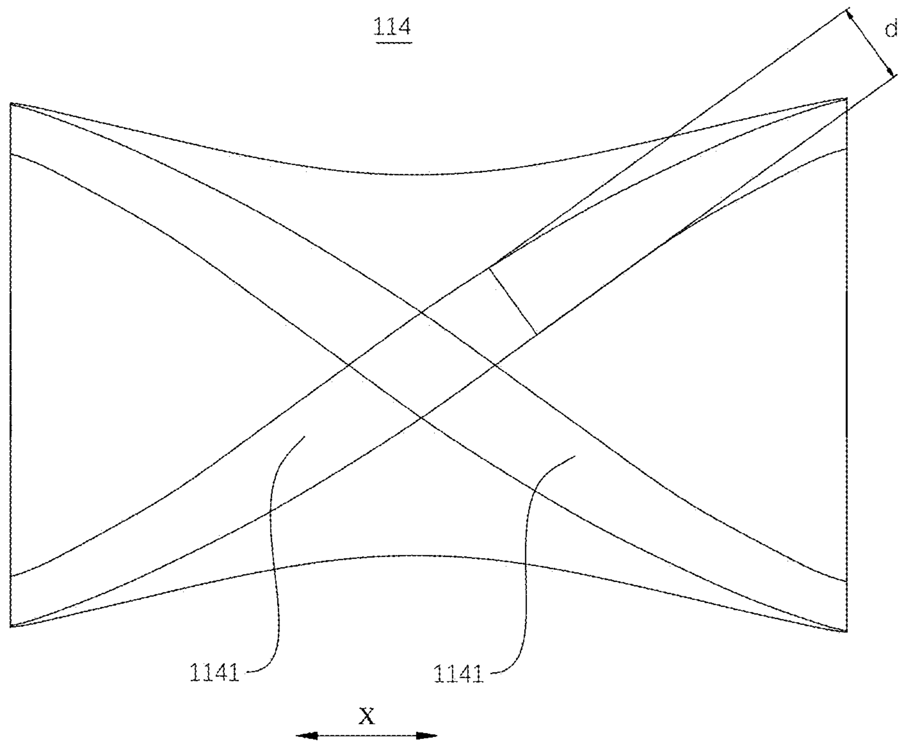
FIG. 3 is a front view of an internal mixing rotor element provided in some embodiments of the present application.

According to some embodiments of the present application, with continued reference to FIG. 2 and further reference to FIG. 3, FIG. 3 is a front view of the internal mixing rotor element provided in some embodiments of the present application. The width of a screw edge 1141 of the internal mixing rotor element 114 is d, the outer diameter of the screw 11 is D, 0.02 D≤d≤0.15 D, and in some embodiments 0.04 D≤d≤0.1 D.

The structure of the internal mixing rotor element is shown in FIG. 3, during the use process of the internal mixing rotor element 114, a pair of internal mixing rotor elements 114 is generally used in cooperation, and the pair of internal mixing rotor elements 114 is in mirror symmetry connection with each other along the axis of the screw 11 (an X direction shown in FIG. 2 and FIG. 3). An accommodating space is formed between the screw edges 1141 of the internal mixing rotor elements 114 in an enclosing mode for accommodating a certain amount of active substance mixture, the active substance mixture is mainly sheared and kneaded in the accommodating space and a slit between the screw edge 1141 and an inner wall of the cylinder 12, thereby realizing the effects of uniformly mixing the active substance mixture and shearing the binder.

In the present embodiment, both the width d of the screw edge 1141 of the internal mixing rotor element 114 and the outer diameter D of the screw 11 may be fixed values, and the width d of the screw edge 1141 of the internal mixing rotor element 114 may be any value greater than or equal to 0.02 D and less than or equal to 0.15 D, for example, d may be 0.02 D, 0.03 D, 0.035 D, 0.05 D, 0.1 D, 0.12 D, 0.15 D, etc.

In some embodiments, the width d of the screw edge 1141 of the internal mixing rotor element 114 may be any value greater than or equal to 0.04 D and less than or equal to 0.1 D, for example, d may be 0.04 D, 0.05 D, 0.06 D, 0.075 D, 0.08 D, 0.09 D, 0.1 D, etc.

For example, the width d of the screw edge 1141 of the internal mixing rotor element 114 is 0.06 D.

The inventor discovers that, if the width of the screw edge 1141 of the internal mixing rotor element 114 is too large, the free volume of the accommodating space is relatively small, meanwhile, channel resistance formed by the space between the screw edge 1141 and the inner wall of the cylinder 12 is increased, the moving speed of the active substance mixture is reduced due to the shearing action, and the number of times for shearing the active substance mixture is correspondingly reduced, easily resulting in insufficient mixing of the active substance mixture; and on the contrary, if the width of the screw edge 1141 of the internal mixing rotor element 114 is too small, the free volume of the accommodating space is increased, the active substance mixture is easily accumulated in the accommodating space, meanwhile, the shearing rate is increased when the active substance mixture passes through the space between the screw edge 1141 and the cylindrical wall, and the number of shearing times is correspondingly increased, thereby easily resulting in the problems of excessive shearing of the active substance mixture and damage to the binder structure. In the technical solution of the present application, the ratio of the width of the screw edge 1141 of the internal mixing rotor element 114 to the outer diameter of the screw 11 is set between 0.02 and 0.15, which can effectively ensure that the active substance mixture is sufficiently and uniformly mixed while avoiding excessive shearing, thereby effectively ensuring the production quality of the membrane, and thus effectively ensuring the production quality of the battery.

Figure 4:
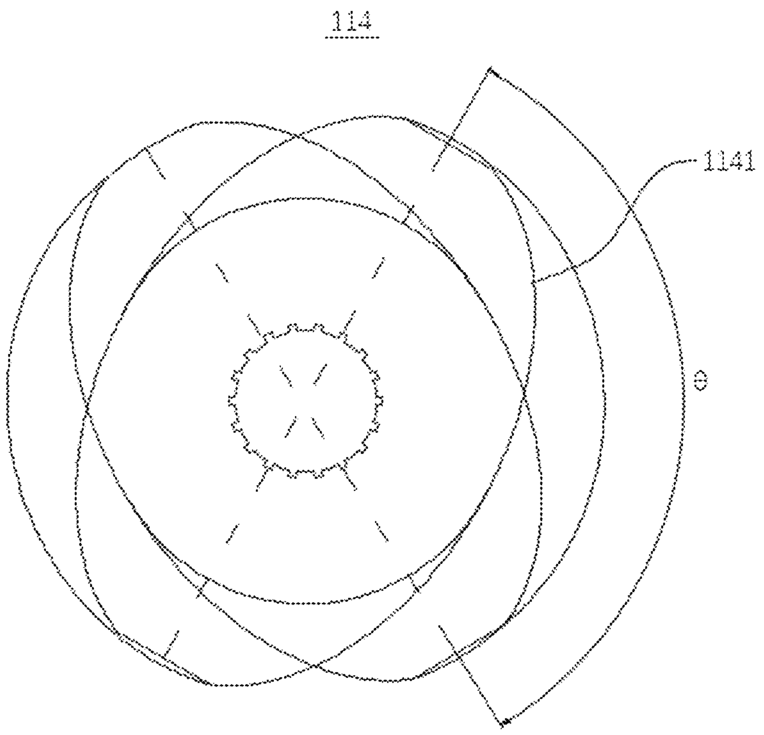
FIG. 4 is a side view of the internal mixing rotor element shown in FIG. 3.

According to some embodiments of the present application, with continued reference to FIG. 3 and further reference to FIG. 4, FIG. 4 is a side view of the internal mixing rotor element shown in FIG. 3, the helical angle of the screw edge 1141 of the internal mixing rotor element 114 is θ, 90°≤θ≤150°, and in some embodiments, 110°≤θ≤130°.

The helical angle of the screw edge 1141 refers to an angle between a starting end and a tail end of the screw edge 1141 of the internal mixing rotor element 114 in a plane perpendicular to the axis of the screw 11.

The helical angle θ of the screw edge 1141 may be any value greater than or equal to 90° and less than or equal to 150°, for example, θ may be 90°, 92°, 95°, 100°, 140°, 150°, etc.

In some embodiments, the helical angle θ of the screw edge 1141 may be any value greater than or equal to 110° and less than or equal to 130°, for example, θ may be 110°, 115°, 120°, 125°, 128°, 130°, etc.

For example, θ may be 120°.

The inventor discovers that, if the helical angle is less than 90°, too few active substance mixture is accommodated in the space formed between the screw edges 1141, and the shearing and mixing time of the active substance mixture by the internal mixing rotor element 114 is too short, which is not conducive to the sufficient mixing of the active substance mixture; and if the helical angle is greater than 150°, too many active substance mixture is accommodated in the space formed between the screw edges 1141, so that the active substance mixture close to the thread element cannot be updated along with continuous forward push of the active substance mixture, as a result, the active substance mixture with high solid content is easily deposited in the internal mixing rotor element 114, and the materials with low solid content flow forwards from the outer layer of the internal mixing rotor element 114, easily resulting in uneven components of the active substance mixture as well. In the technical solution of the present application, the helical angle of the screw edge 1141 is designed to be greater than or equal to 90° and less than or equal to 150°, so that sufficient and uniform mixing of the active substance mixture can be effectively ensured.

Figure 5:
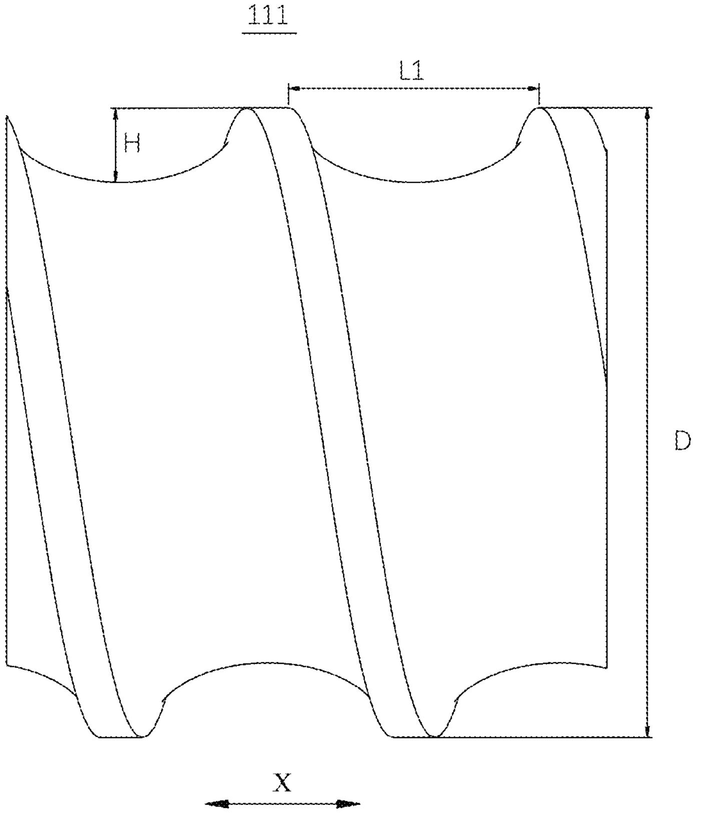
FIG. 5 is a front view of a first thread conveying element provided in some embodiments of the present application.
Figure 6:
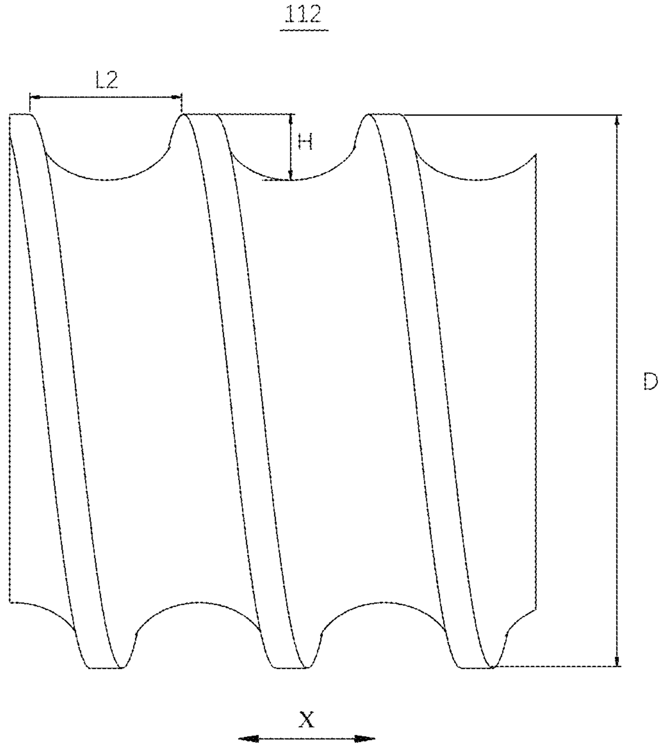
FIG. 6 is a front view of a second thread conveying element provided in some embodiments of the present application.

According to some embodiments of the present application, with continued reference to FIG. 2 and further reference to FIG. 5 and FIG. 6, FIG. 5 is a front view of a first thread conveying element provided in some embodiments of the present application; and FIG. 6 is a front view of a second thread conveying element provided in some embodiments of the present application. The thread conveying element includes a first thread conveying element 111 and a second thread conveying element 112, the outer diameter of the screw 11 is D, the screw pitch of the first thread conveying element 111 is L1, the screw pitch of the second thread conveying element 112 is L2, 0.8 D≤L1≤1.2 D, and 0.5 D≤L2≤0.8 D.

By means of providing the first thread conveying element 111 and the second thread conveying element 112, which have different screw pitches, the volumes of thread grooves of the first thread conveying element 111 and the second thread conveying element 112 are conveniently controlled, and the volumes of the thread grooves of the first thread conveying element 111 and the second thread conveying element 112 are different, so that the first thread conveying element 111 and the second thread conveying element 112 have different treatment capacities for the active substance mixture, and different conveying forces and extrusion forces can be conveniently provided for the active substance mixture, so as to meet the requirements of different sections of the screw 11 for the conveyance and pressure establishment of the active substance mixture.

The outer diameter D of the screw 11 is a fixed value, and the screw pitch L1 of the first thread conveying element 111 may be any value greater than or equal to 0.8 D and less than or equal to 1.2 D, for example, L1 may be 0.8 D, 0.85 D, 0.9 D, 0.91 D, 1.0 D, 1.1 D, 1.2 D, etc. Exemplarily, L1 may be 1.2D.

The screw pitch L2 of the second thread conveying element 112 may be any value greater than or equal to 0.5 D and less than or equal to 0.8 D, for example, L2 may be 0.5 D, 0.6 D, 0.65 D, 0.7 D, 0.8 D, etc. Exemplarily, L2 may be 0.8 D.

The first thread conveying element 111 and the second thread conveying element 112 having different screw pitches play a role in adjusting the conveying speed of the active substance mixture, so that the active substance mixture can be conveyed at a variable speed, the active substance mixture can be smoothly conveyed and sufficiently mixed and sheared in the twin-screw machine, and finally becomes denser under the pressure establishment effect of the screw 11.

In addition, the screw pitch of the screw 11 affects the volume of the thread groove of the screw 11, thereby affecting the extrusion amount and the shearing and mixing degree of the active substance mixture; if the screw pitch is too small, the extrusion amount is insufficient, which is not conducive to improving the production efficiency of the electrode sheet; and if the screw pitch is too large, the volume of the thread groove is too large, therefore excessive active substance mixture is accumulated between the thread grooves, so that the active substance mixture in the thread grooves cannot be updated in time, thus affecting the uniformity of dispersing and mixing the active substance mixture. In the present application, the screw pitch of the second thread element is set between 0.5 D and 0.8 D, and the screw pitch of the first thread conveying element 111 is set between 0.8 D and 1.2 D, so that the extrusion amount of the screw 11 and the mixing uniformity of the active substance mixture can be effectively considered.

According to some embodiments of the present application, 0.9 D≤L1≤1.1 D, 0.6 D≤L2≤0.7 D.

The outer diameter D of the screw 11 is a fixed value, and the screw pitch L1 of the first thread conveying element 111 may be any value greater than or equal to 0.9 D and less than or equal to 1.1 D, for example, L1 may be 0.9 D, 0.91 D, 0.92 D, 0.93 D, 0.96 D, 0.98 D, 1.05 D, 1.1 D, etc. Exemplarily, L1 may be 1.0 D.

The screw pitch L2 of the second thread conveying element 112 may be any value greater than or equal to 0.6 D and less than or equal to 0.7 D, for example, L2 may be 0.6 D, 0.61 D, 0.62 D, 0.66 D, 0.7 D, etc. Exemplarily, L2 may be 0.6 D.

The screw pitch of the second thread element is set between 0.5 D and 0.8 D, and the screw pitch of the first thread conveying element 111 is set between 0.8 D and 1.2 D, so that the mixing uniformity of the active substance mixture can be further improved while the extrusion amount of the screw 11 is increased.

According to some embodiments of the present application, with continued reference to FIG. 2, the screw 11 includes a plurality of groups of internal mixing rotor conveying assemblies, each group of internal mixing rotor conveying assemblies includes two internal mixing rotor elements 114 and one second thread conveying element 112, which are sequentially disposed in the conveying direction of the screw 11, the second thread conveying element 112 is directly connected with the internal mixing rotor elements 114, and the two internal mixing rotor elements 114 are in mirror symmetry connection with each other along the axis of the screw 11.

As described above, during the use process of the internal mixing rotor elements 114, a pair of internal mixing rotor elements 114 is generally used in cooperation, and the pair of internal mixing rotor elements 114 is in mirror symmetry connection with each other along the axis of the screw 11. The internal mixing rotor conveying assembly includes two internal mixing rotor elements 114, the two internal mixing rotor elements 114 are in mirror symmetry and connected with each other along the axis of the screw 11, an accommodating space is formed between the screw edges 1141 of the internal mixing rotor elements 114 in an enclosing mode for accommodating a certain amount of active substance mixture, and the active substance mixture is mainly sheared and kneaded in the accommodating space and a slit between the screw edge 1141 and the inner wall of the cylinder 12.

The second thread conveying element 112 is directly connected with one of the internal mixing rotor elements 114, and the two internal mixing rotor elements 114 and one second thread conveying element 112 are sequentially disposed in the conveying direction of the screw 11, that is, the second thread conveying element 112 is disposed at the downstream of the two internal mixing rotor elements 114.

The own conveying capability of the internal mixing rotor element is relatively weak, in the technical solution of the present application, one second thread conveying element 112 is directly connected to the downstream of the internal mixing rotor element 114, so that the active substance mixture sheared and kneaded by the internal mixing rotor element 114 can be conveyed in time, so that it is possible to effectively reduce the risk of the active substance mixture being deposited in the internal mixing rotor element 114, causing the screw 11 to be locked. The structure of the overall internal mixing rotor conveying assembly ensures the smooth conveyance of the active substance mixture while ensuring the sufficient shearing and mixing of the active substance mixture.

Figure 7:
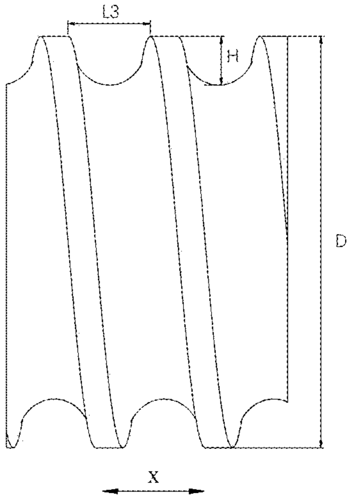
FIG. 7 is a front view of a third thread conveying element provided in some embodiments of the present application.

According to some embodiments of the present application, with continued reference to FIG. 2 and further reference to FIG. 7, FIG. 7 is a front view of a third thread conveying element provided in some embodiments of the present application. The thread conveying element further includes a third thread conveying element 113, the screw pitch of the third thread conveying element 113 is L3, 0.2 D≤L3≤0.5 D, and in some embodiments, 0.3 D≤L3≤0.45 D.

The screw pitch L3 of the third thread conveying element is less than or equal to the screw pitch of the second thread conveying element 112 and is less than the screw pitch of the first thread conveying element 111. Under the condition that the depths of the thread grooves of the first thread conveying element 111, the second thread conveying element 112 and the third thread conveying element 113 are the same, the treatment capacity of the third thread conveying element 113 for the active substance mixture is relatively minimum, and the conveying speed of the active substance mixture is relatively lowest.

The outer diameter D of the screw 11 is a fixed value, and the screw pitch L3 of the third thread conveying element 113 may be any value greater than or equal to 0.2 D and less than or equal to 0.5 D, for example, L3 may be 0.2 D, 0.3 D, 0.35 D, 0.4 D, 0.5 D, etc.

In some embodiments, the screw pitch L3 of the third thread conveying element 113 may be any value greater than or equal to 0.3 D and less than or equal to 0.45 D, for example, L3 may be 0.3 D, 0.32 D, 0.34 D, 0.41 D, 0.43 D, 0.45 D, etc.

Exemplarily, the screw pitch L3 of the third thread conveying element 113 may be 0.4 D.

The third thread conveying element 113 may further reduce the conveying speed of the active substance mixture and further promote the pressure establishment of the active substance mixture, so that the active substance mixture is denser, the interface fusion performance is better, and the compacted active substance mixture can be conveniently and evenly sent out from the twin-screw machine, which is conducive to further ensuring the uniformity of the subsequent extrusion molding of the membrane.

The screw pitch of the third thread conveying element 113 is set between 0.2 D and 0.5 D, which is conducive to playing a sufficient pressure establishment effect on the active substance mixture while ensuring the conveying amount of the active substance mixture, thereby ensuring the compactness and uniformity of the active substance mixture.

According to some embodiments of the present application, with continued reference to FIG. 2, the screw 11 includes a first thread conveying element 111, an internal mixing rotor conveying assembly, a first thread conveying element 111, an internal mixing rotor conveying assembly, a first thread conveying element 111, a second thread conveying element 112 and a third thread conveying element 113, which are sequentially disposed in the conveying direction of the screw 11.

The conveying direction of the screw 11 extends in the X direction shown in FIG. 2, one or more first thread conveying elements 111 may be provided, one or more groups of internal mixing rotor conveying assemblies may be provided, one or more second thread conveying elements 112 may be provided, and one or more third thread conveying elements 113 may be provided.

As shown in FIG. 2, in some embodiments, the screw 11 includes six first thread conveying elements 111, three groups of internal mixing rotor conveying assemblies, three first thread conveying elements 111, two groups of internal mixing rotor conveying assemblies, four first thread conveying elements 111, one second thread conveying element 112 and four third thread conveying elements 113, which are sequentially disposed in the conveying direction of the screw 11.

In some other embodiments, the screw 11 may also be of other structures, for example, the screw 11 may include a first thread conveying element 111, an internal mixing rotor conveying assembly, a first thread conveying element 111, a second thread conveying element 112 and a third thread conveying element 113, which are sequentially disposed in the conveying direction of the screw 11.

For example, the screw 11 may include six first thread conveying elements 111, eight groups of internal mixing rotor conveying assemblies, four first thread conveying elements 111, one second thread conveying element 112 and four third thread conveying elements 113, which are sequentially disposed in the conveying direction of the screw 11.

The first thread conveying element 111 with a longer screw pitch is disposed at the upstream of the screw 11, and the conveying efficiency thereof is high, thereby being conducive to conveying the active substance mixture to the internal mixing rotor element 114 at the downstream; a middle section of the screw 11 is alternately provided with the internal mixing rotor conveying assembly and the first thread conveying element 111 to form a mixing section of the screw 11, thereby ensuring that the active substance mixture can be smoothly conveyed to the tail end of the screw 11 while ensuring the sufficient shearing and mixing of the active substance mixture; the tail end of the screw 11 is sequentially provided with the first thread conveying element 111, the second thread conveying element 112 and the third thread conveying element 113, which have gradually decreasing screw pitches, so as to effectively reduce the conveying speed of the active substance mixture and play a sufficient pressure establishment role on the active substance mixture, so that the active substance mixture is denser and more uniform; and finally, the third thread conveying element 113 uniformly sends out the compacted active substance mixture from the twin-screw machine, which is conducive to further ensuring the uniformity of the subsequent extrusion molding of the membrane.

According to some embodiments of the present application, with reference to FIG. 5 to FIG. 7, the depth of the thread groove of the thread conveying element is H, the outer diameter of the screw 11 is D, 0.1 D≤H≤0.15 D, and in some embodiments 0.12 D≤H≤0.14 D.

In the implementation form that "the screw 11 includes a first thread conveying element 111, a second thread conveying element 112, and a third thread conveying element 113", the depths of the thread grooves of the first thread conveying element 111, the second thread conveying element 112 and the third thread conveying element 113 are all H.

The outer diameter D of the screw 11 may be a fixed value, and the depth H of the thread groove of the thread conveying element may be any value greater than or equal to 0.1 D and less than or equal to 0.15 D, for example, H may be 0.1 D, 0.11 D, 0.12 D, 0.135 D, 0.14 D, 0.15 D, etc.

In some embodiments, the depth H of the thread groove of the thread conveying element may be any value greater than or equal to 0.12 D and less than or equal to 0.14 D, for example, H may be 0.12 D, 0.125 D, 0.128 D, 0.13 D, 0.136 D, 0.138 D, etc.

Exemplarily, the depth H of the thread groove of the thread conveying element may be 0.13 D.

If the depth of the thread groove of the screw 11 is too large, the structural strength of the screw 11 may be affected, such that the screw 11 is prone to shearing anomaly under a relatively large torsion, therefore if the depth of the thread groove is too large, the rotating speed and the treatment capacity of the screw 11 are limited, and excessive active substance mixture is accumulated between the thread grooves, thereby affecting the updating timeliness and the dispersion uniformity of the active substance mixture in the thread grooves; and if the depth of the thread groove is too small, the conveying capability and the extrusion amount of the screw 11 are reduced, and the shearing force of the screw 11 on the active substance mixture is prone to be too large, thereby increasing the risk of damaging the fiber structure of the binder. In the present embodiment, the depth of the thread groove of the thread conveying element is set between 0.1 D and 0.15 D, therefore the structural strength, the treatment capacity and the conveying capacity of the screw 11 can be effectively considered, and the risk of structural damage to the binder caused by the too large shearing force is effectively reduced, thereby effectively ensuring the manufacturing quality of the electrode sheet.

According to some embodiments of the present application, with reference to FIG. 2 again, the twin-screw machine includes a cylinder 12 and a screw 11, wherein the screw 11 is rotatably disposed in the cylinder 12, a gap between an outer circumferential surface of the screw 11 and an inner wall of the cylinder 12 is L4, 0.1 mm≤L4≤0.6 mm, and in some embodiments, 0.3 mm≤L4≤0.5 mm.

The cylinder 12 provides an accommodating space for the active substance mixture, and the outer circumferential surface of the screw 11 refers to an outer circumferential surface corresponding to the outer diameter of the screw 11. Based on the implementation form that the "screw 11 includes a first thread conveying element 111, a second thread conveying element 112, a third thread conveying element 113 and a internal mixing rotor element 114", the gaps between different sections of the screw 11 and the cylinder 12 may be the same or different.

The gap L4 between the outer circumferential surface of the screw 11 and the inner wall of the cylinder 12 may be any value greater than or equal to 0.1 mm and less than or equal to 0.6 mm, for example, L4 may be 0.1 mm, 0.2 mm, 0.3 mm, 0.4 mm, 0.45 mm, 0.6 mm, etc.

In some embodiments, L4 may be any value greater than or equal to 0.3 mm and less than or equal to 0.5 mm, for example, L4 may be 0.3 mm, 0.32 mm, 0.35 mm, 0.4 mm, 0.42 mm, 0.46 mm, 0.5 mm, etc.

Exemplarily, L4 may be 0.5 mm.

If the gap between the screw 11 and the cylinder 12 is too large, the reverse flow and leakage phenomena of the active substance mixture are serious, easily resulting in a fluctuation in the extrusion pressure, thereby affecting the extrusion amount of the screw 11; moreover, due to the increase in the back flow and leakage phenomena, the powder mixture and the solution cannot be sufficiently infiltrated and mixed, resulting in aggravated friction of the active substance mixture, which leads to overheat of the active substance mixture, thereby leading to an irreversible damage to the materials such as the binder; however, if the gap between the screw 11 and the cylinder 12 is too small, a tiny deformation of the screw 11 during an extrusion process of the active substance mixture may result in friction between the screw 11 and the inner wall of the cylinder 12, thereby not only affecting the service life of the twin-screw machine, and moreover, metal chippings are easily introduced by the friction, thus bringing a huge hidden danger to the service life and safety of the battery. In the technical solution of the present application, the gap between the screw 11 and the cylinder 12 is designed and limited between 0.1 mm and 0.6 mm, such that the back flow and leakage phenomena can be effectively reduced, thereby improving the sufficiency of infiltration and mixing of the powder mixture and the solution, thus reducing the risk of damaging the properties of the active substance mixture due to excessive heat generated by the friction of the active substance mixture, and effectively ensuring the stability of the properties of the active substance mixture, and thus the production quality of the battery is improved; and meanwhile, the risk of friction between the screw 11 and the cylinder 12 is effectively reduced, so that the service life of the twin-screw machine is effectively ensured.

According to some embodiments of the present application, as shown in FIG. 2, in the conveying direction of the screw 11, the first feeding mechanism 20 is located at the upstream of the second feeding mechanism 30.

The conveying direction of the screw 11 extends in the X direction as shown in FIG. 2. As described above, the first feeding mechanism 20 is used for adding, into the mixing mechanism 10, the powder mixture containing powder and the first binder, the second feeding mechanism 30 is used for adding, into the mixing mechanism 10, the solution dissolved with the second binder, the first feeding mechanism 20 is disposed at the upstream of the second feeding mechanism 30, therefore the powder mixture can be conveniently added into the mixing mechanism 10, and then the solution is added, by means of the second feeding mechanism 30, into the powder mixture which is conveyed by the screw 11 and is being stirred, such that the powder mixture is progressively and uniformly infiltrated and mixed with the solution during the conveying process of the screw 11, thereby effectively ensuring the contact sufficiency of the powder mixture and the solution, and thus further improving the mixing uniformity of the powder mixture and the solution.

According to some embodiments of the present application, the first feeding mechanism 20 is a weightlessness scale.

The weightlessness scale is an automatic weighing device for realizing high-precision continuous quantitative feeding in a static weighing manner, which can reliably, accurately and stably feed powder, particles, flakes and other dry powder active substance mixtures, thereby reducing the waste of the active substance mixtures and improving the consistency of the mixtures.

The weightlessness scale is a common feeding mechanism in the industrial field, and the refined structure of the weightlessness scale is not uniquely defined and repeatedly described in the present embodiment.

Figure 8:
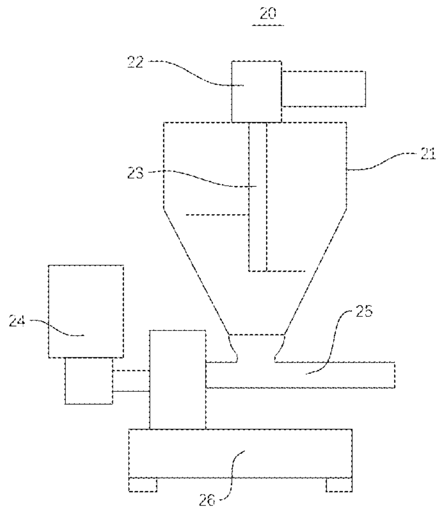
FIG. 8 is a schematic diagram of a simple structure of a first feeding mechanism provided in some embodiments of the present application.

For example, as shown in FIG. 8, FIG. 8 is a schematic diagram of a simple structure of the first feeding mechanism provided in some embodiments of the present application, the weightlessness scale may include a stock bin 21, a stirring motor 22, a stirring paddle 23, a feeding motor 24, a feeding screw 25, a first weighing platform 26, and the like, wherein the stirring motor 22 is used for driving the stirring paddle 23 to rotate, thereby preventing uneven feeding caused by bridging of the powder mixture in the stock bin 21; the feeding motor 24 drives the feeding screw 25 to rotate to convey the powder mixture in the stock bin 21, so that the powder mixture falls into the twin-screw machine, and at the same time, the first weighing platform 26 of the weightlessness scale may monitor the weight of the powder mixture in real time, and quantitatively control the blanking amount of the powder mixture.

The weightlessness scale is selected as the first feeding mechanism, the weightlessness scale can realize high-precision continuous quantitative feeding in the static weighing mode, thereby effectively ensuring the reliability, accuracy and stability of feeding the powder mixture; and the proportion of the powder mixture and the solution can be conveniently and stably controlled, thereby ensuring the uniformity and consistency of mixing the active substance mixture, and thus effectively improving the production quality of the battery.

According to some embodiments of the present application, the second feeding mechanism 30 is a metering pump.

The metering pump is one of fluid conveying machines, which is characterized by being able to maintain a constant flow rate independent of a discharge pressure, so as to facilitate the conveying of the solution at a stable flow rate, the metering pump is a common feeding mechanism for liquid conveyance, and a refined structure of the metering pump is not uniquely defined and repeatedly described in the present embodiment.

Figure 9:
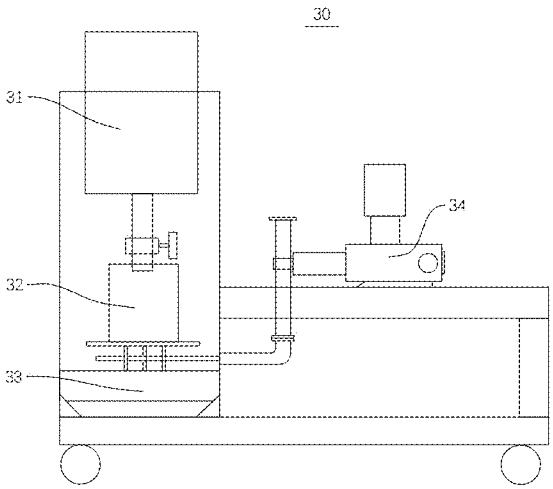
FIG. 9 is a schematic diagram of a simple structure of a second feeding mechanism provided in some embodiments of the present application.

Exemplarily, as shown in FIG. 9, FIG. 9 is a schematic diagram of a simple structure of a second feeding mechanism provided in some embodiments of the present application. The metering pump includes a storage silo 31, a metering hopper 32, a second weighing platform 33 and a pump body 34, wherein liquid in the storage silo 31 falls into the metering hopper 32, the metering hopper 32 is connected with the second weighing platform 33, and the liquid in the metering hopper 32 is stably pumped out by the pump body 34 and enters the twin-screw machine through the discharge port 43.

The metering pump is selected as the second feeding mechanism 30, the metering pump may convey the solution at a stable flow rate, thereby effectively ensuring the reliability, accuracy and stability of solution feeding, facilitating the stable control of the proportion of the powder mixture and the solution, ensuring the uniformity and consistency of mixing the active substance mixture, and effectively improving the production quality of the battery.

Figure 10:
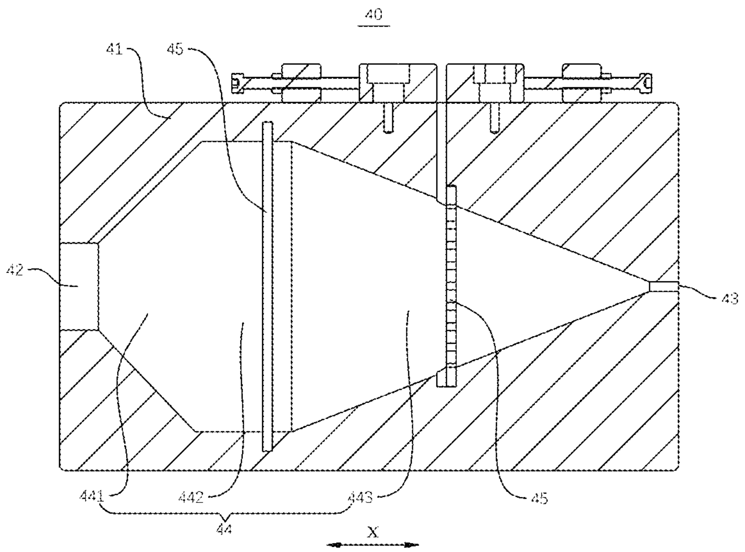
FIG. 10 is a front cross-sectional view of an extrusion die head provided in some embodiments of the present application.
Figure 11:
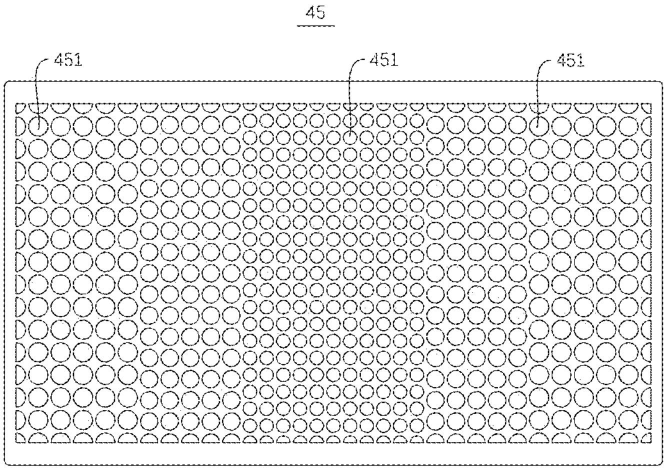
FIG. 11 is a schematic structural diagram of a flow equalizing plate provided in some embodiments of the present application.
Figure 12:
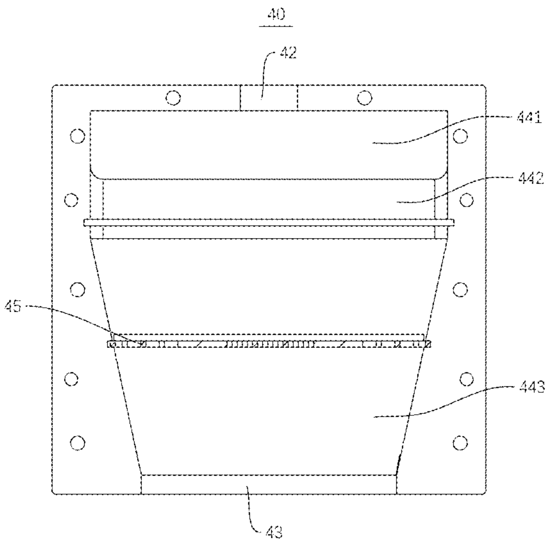
FIG. 12 is a top view of an extrusion die head provided in some embodiments of the present application.

According to some embodiments of the present application, referring to FIG. 10 to FIG. 12, FIG. 10 is a front cross-sectional view of the extrusion die head provided in some embodiments of the present application; FIG. 11 is a schematic structural diagram of a flow equalizing plate provided in some embodiments of the present application; and FIG. 12 is a top view of the extrusion die head provided in some embodiments of the present application. The extrusion die head 40 includes a die head body 41 and a flow equalizing plate 45, the die head body 41 is provided with a feed port 42, a discharge port 43 and a material cavity 44 for communicating the feed port 42 with the discharge port 43, the flow equalizing plate 45 is disposed in the material cavity 44, the flow equalizing plate 45 divides the material cavity 44 into a first cavity communicating with the feed port 42 and a second cavity communicating with the discharge port 43, the flow equalizing plate 45 is provided with a plurality of through holes 451, and the plurality of through holes 451 communicate with the first cavity and the second cavity.

As described above, the extrusion die head 40 may be of a conventional plunger structure, a clothes hanger structure, a fishtail structure, and the like, and if the type of the extrusion die head 40 is different, the shape of the material cavity 44 may also be different. The material cavity 44 functions to communicate the feed port 42 with the discharge port 43, and provide a buffer space for the active substance mixture.

The flow equalizing plate 45 may be used for adjusting the extrusion speed of the extrusion die head 40 in the length direction of the discharge port 43 (i.e., the width direction of the membrane), the plurality of through holes 451 on the flow equalizing plate 45 may be distributed in rows, and each row of through holes 451 includes a plurality of through holes 451, which are formed at intervals in the length direction of the discharge port 43. Of course, the plurality of through holes 451 on the flow equalizing plate 45 may also be distributed in a matrix.

The flow equalizing plate 45 may play a flow equalizing role by means of controlling the sizes of the through holes 451, and the flow equalizing plate 45 may also play the flow equalizing role by means of controlling the density of the through holes 451.

The shape of the through hole 451 may be various shapes such as a circle, a rectangle, a triangle, and the like, which is not limited in the present embodiment.

The flow equalizing plate 45 may be integrally formed with the die head body 41, and may also be disposed separately from the die head body 41 and assembled on the die head body 41. For example, an outer circumferential surface of the die head body 41 may be provided with a slot, the slot communicates the material cavity 44 with an external space of the die head body 41, and the flow equalizing plate 45 may be inserted into the slot to be detachably connected with the die head body 41.

In some other embodiments, the flow equalizing plate 45 may also be used for adjusting the extrusion uniformity of the extrusion die head 40 in the width direction of the discharge port 43 (i.e., the thickness of the membrane) or other directions.

The flow equalizing plate 45 is disposed in the extrusion die head 40, and the design of the flow equalizing plate 45 effectively adjusts the extrusion speed of the extrusion die head 40, so that the extrusion speed of the active substance mixture in the length direction of the discharge port 43 is more uniform, so as to improve the uniformity of extruding the active substance mixture in the length direction of the discharge port 43.

According to some embodiments of the present application, as shown in FIG. 11, in the length direction of the discharge port 43, the diameters of the through holes 451 gradually increase from the middle of the flow equalizing plate 45 to two sides.

It can be understood that, the cross-sectional shape of the discharge port 43 corresponds to the cross-sectional shape of the finally extruded membrane, and the extrusion die head 40 in the present embodiment is used for extruding the membrane, then the length direction of the discharge port 43 extends in the width direction of the finally extruded membrane.

That is, in the length direction of the discharge port 43, the diameter of the through hole 451 close to the middle position of the flow equalizing plate 45 is smaller, and the diameter of the through hole 451 close to the two sides of the flow equalizing plate 45 is greater.

The flow resistance of the active substance mixture is adjusted by means of limiting the change in the diameter of the through hole 451, so that the active substance mixture may be blended from the middle to the two sides in the length direction of the discharge port 43, thereby reducing the risk that the flow velocity of the active substance mixture at the middle of the length direction of the discharge port 43 is too large, and the flow velocity of the active substance mixture on the two sides of the length direction of the discharge port 43 is too small, such that the uniformity of extruding the active substance mixture in the length direction of the discharge port 43 is improved.

According to some embodiments of the present application, as shown in FIG. 10 and FIG. 12, the material cavity 44 includes a flow splitting region 441, a buffer region 442 and a pressure establishment region 443, the flow splitting region 441, the buffer region 442 and the pressure establishment region 443 are sequentially arranged in a direction pointing from the feed port 42 to the discharge port 43, the sectional area of the flow splitting region 441 gradually increases from the feed port 42 to the buffer region 442, and the sectional area of the pressure establishment region 443 gradually decreases from the buffer region 442 to the discharge port 43.

The flow splitting region 441 communicates with the feed port 42, the sectional area of the flow splitting region 441 gradually increases from the feed port 42 to the buffer region 442, the active substance mixture entering the material cavity 44 from the feed port 42 is gradually split in the flow splitting region 441, and gradually fills the material cavity 44 in the buffer region 442, thereby avoiding the presence of gaps in the active substance mixture. The sectional area of the pressure establishment region 443 gradually decreases from the buffer region 442 to the discharge port 43, and the active substance mixture is extruded by the change in the cross section, so that the active substance mixture can be compacted, and the compactness of the finally extruded membrane is ensured, thereby effectively ensuring the structural uniformity and continuity of the extruded membrane.

It can be understood that, the sizes of the flow splitting region 441 and the buffer region 442 in the length direction of the discharge port 43 may be greater than the length of the discharge port 43, so as to ensure the structural compactness of the extruded membrane in the width direction thereof, and reduce the risk of generating problems such as vacancy and partial weakness of the membrane.

According to some embodiments of the present application, the flow equalizing plate 45 is disposed in the pressure establishment region 443 and/or the buffer region 442.

Specifically, one or more flow equalizing plates 45 may be provided, and when one flow equalizing plate 45 is provided, the flow equalizing plate 45 may be disposed in the pressure establishment region 443 and may also be disposed in the buffer region 442. For example, the flow equalizing plate 45 may be disposed in the pressure establishment region 443, so that the flow equalizing plate 45 is close to the discharge port 43, thereby further ensuring the flow equalizing effect of the flow equalizing plate 45.

When a plurality of flow equalizing plates 45 are provided, the plurality of flow equalizing plates 45 may be disposed in the pressure establishment region 443 at intervals, and may also be disposed in the buffer region 442 at intervals, or at least one flow equalizing plate 45 is disposed in the pressure establishment regions 443, and at least one flow equalizing plate 45 is disposed in the buffer region 442.

Exemplarily, two flow equalizing plates 45 are provided, one is disposed in the pressure establishment regions 443, and the other is disposed in the buffer region 442.

The flow equalizing plate 45 is disposed in the pressure establishment region 443 and/or the buffer region 442, which is beneficial to further ensuring the uniformity of extruding the active substance mixture in the length direction of the discharge port 43.

Figure 13:
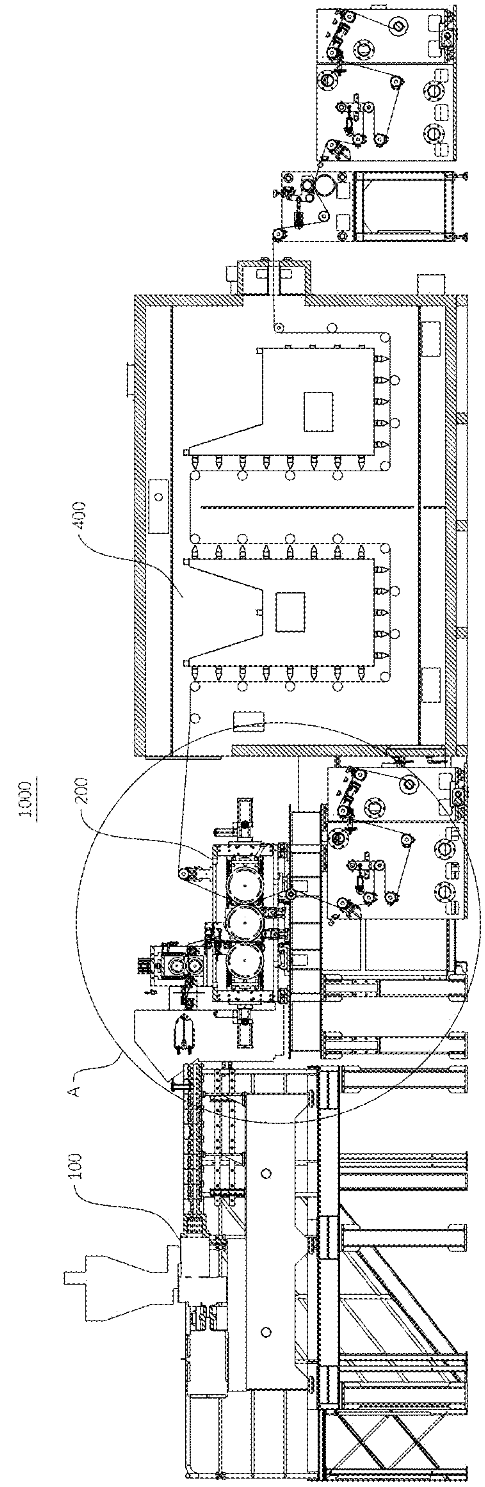
FIG. 13 is a schematic diagram of an overall structure of an electrode sheet manufacturing device provided in some embodiments of the present application.
Figure 14:
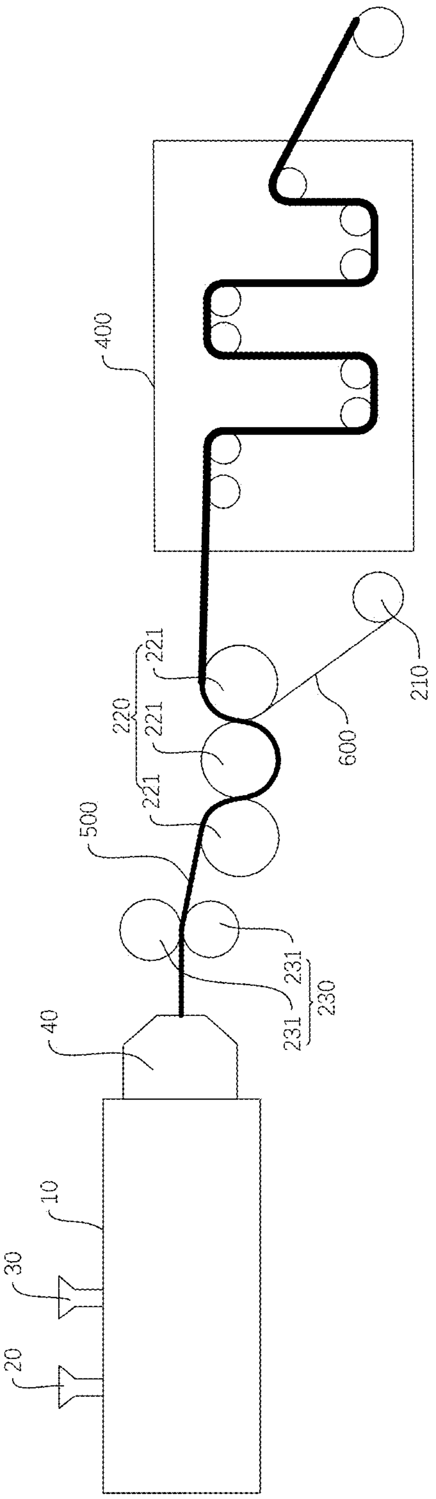
FIG. 14 is a schematic diagram of a simple structure of an electrode sheet manufacturing device provided in some embodiments of the present application.
Figure 15:
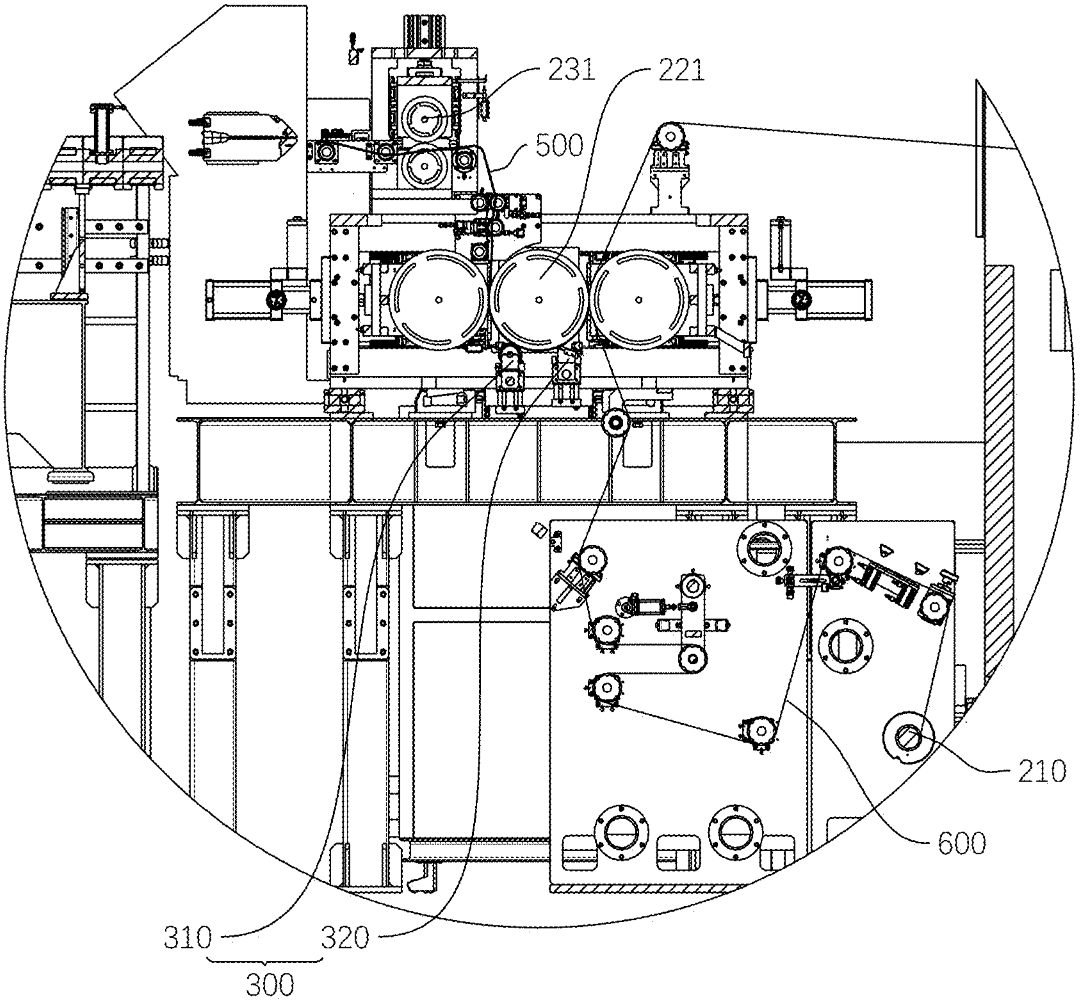
FIG. 15 is a partial enlarged view of a portion A shown in FIG. 13.

With reference to FIG. 1 to FIG. 12 and with further reference to FIG. 13 to FIG. 15, FIG. 13 is a schematic diagram of an overall structure of an electrode sheet manufacturing device provided in some embodiments of the present application; FIG. 14 is a schematic diagram of a simple structure of the electrode sheet manufacturing device provided in some embodiments of the present application; and FIG. 15 is a partial enlarged view of a portion A shown in FIG. 13. Some embodiments of the present application further provide an electrode sheet manufacturing device 1000, the electrode sheet manufacturing device 1000 includes the membrane preparation apparatus 100 in any one of the foregoing solutions and a compounding apparatus 200, the membrane preparation apparatus 100 is used for forming an active substance membrane 500 in an extrusion molding mode, the compounding apparatus 200 is disposed at the downstream of the membrane preparation apparatus 100, and the compounding apparatus 200 is used for compounding a base material 600 with the active substance membrane 500, so as to form an electrode sheet.

The compounding apparatus 200 is disposed at the downstream of the membrane preparation apparatus 100, and is used for compounding the base material 600 with the active substance membrane 500 which is prepared by the membrane preparation apparatus 100, so as to form the electrode sheet.

The compounding apparatus 200 has a plurality of implementation forms, for example, the compounding apparatus 200 may include a rolling mechanism 220 and an unwinding mechanism 210, the rolling mechanism 220 may include at least one pair of compression rollers, and a compounding gap is formed between the pair of compression rollers. The unwinding mechanism 210 may be disposed below the rolling mechanism 220 and is responsible for unwinding the base material 600. The base material 600 and the active substance membrane 500 enter the compounding gap, and the compression rollers perform rolling compounding on the base material 600 and the active substance membrane 500.

Exemplarily, as shown in FIG. 14, the rolling mechanism 220 includes three first compression rollers 221 which are disposed in sequence, a first thinning gap is formed between a No. 1 first compression roller 221 and a second first compression roller 221, a compounding gap is formed between the second first compression roller 221 and a third first compression roller 221, the first thinning gap may be used for thinning the active substance membrane 500, the thinned active substance membrane 500 enters the compounding gap along with the second compression roller, and the second first compression roller 221 and the third first compression roller 221 perform rolling compounding on the base material 600 and the active substance membrane 500.

In some embodiments, the electrode sheet manufacturing device 1000 may further include a thinning mechanism 230, the thinning mechanism 230 is disposed between the membrane preparation apparatus 100 and the compounding apparatus 200 to extrude and thin the membrane extruded by the membrane preparation apparatus 100, as shown in FIG. 14, the thinning mechanism 230 may include two oppositely rotating second compression rollers 231, and a second thinning gap is formed between the two second compression rollers 231. It can be understood that, the width of the second thinning gap (corresponding to the thickness of the active substance membrane) is greater than the width of the first thinning gap, so as to gradually thin the active substance membrane 500.

Figure 16:
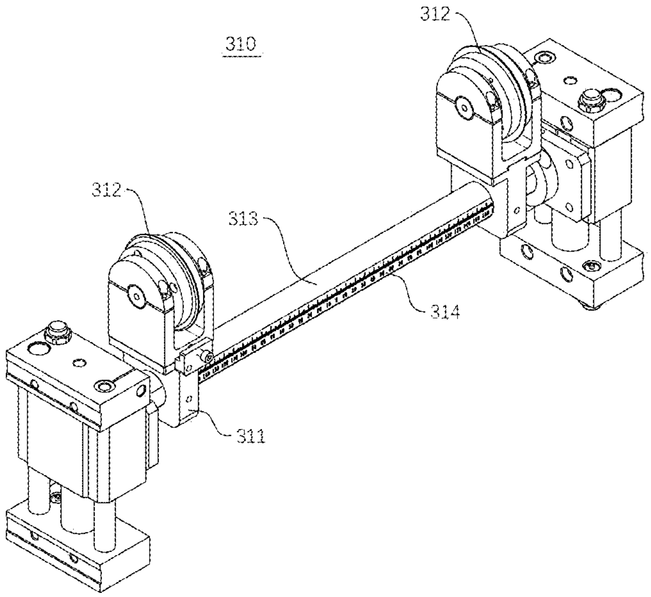
FIG. 16 is a schematic structural diagram of a cutting mechanism provided in some embodiments of the present application.
Figure 17:
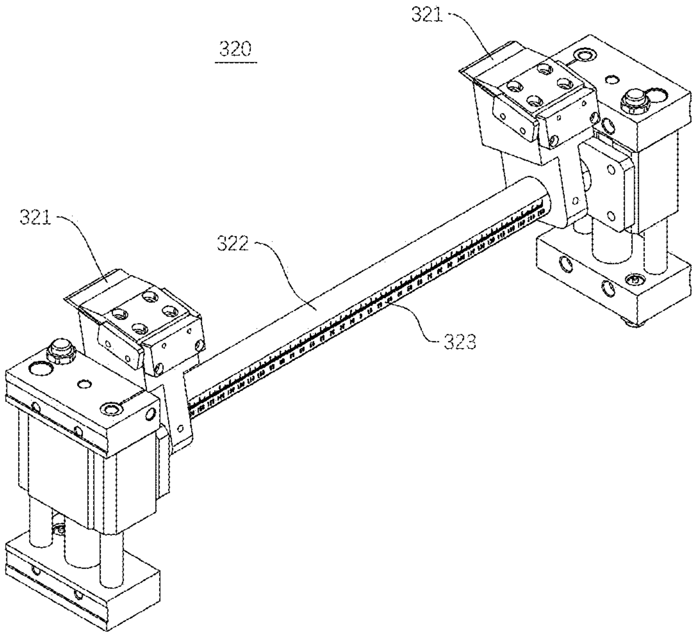
FIG. 17 is a schematic structural diagram of a removal mechanism provided in some embodiments of the present application.

In some other embodiments, referring to FIG. 15 and further referring to FIG. 16 and FIG. 17, FIG. 16 is a schematic structural diagram of a cutting mechanism provided in some embodiments of the present application; and FIG. 17 is a schematic structural diagram of a removal mechanism provided in some embodiments of the present application. The electrode sheet manufacturing device 1000 may further include an edge trimming apparatus 300, the edge trimming apparatus 300 is disposed between a membrane extrusion apparatus and the compounding apparatus 200 for trimming the edge of the membrane, and meanwhile, may be used for changing the width of the membrane.

Based on the implementation form that "the compounding apparatus 200 includes a rolling mechanism 220, and the rolling mechanism 220 includes three first compression rollers 221", the edge trimming apparatus 300 may cooperate with the No. 1 first compression roller 221 to shape the membrane. Specifically, the edge trimming apparatus 300 includes a cutting mechanism 310, and the cutting mechanism 310 is used for abutting against the first compression roller 221 to cut the edge of the membrane in the axial direction of the first compression roller 221, thereby removing the edge of the membrane in the width direction.

Exemplarily, as shown in FIG. 16, the cutting mechanism 310 may include: a base 311, a hobbing cutter 312 and a first guide rail 313; the hobbing cutter 312 is rotatably installed on the base 311, and the hobbing cutter 312 is used for being tangent to the first compression roller 221, so as to cut the membrane; and the base 311 is movably installed on the first guide rail 313 in the axial direction of the first compression roller 221. The first guide rail 313 may also be provided with a first size measurement member 314, and the first size measurement member 314 is disposed on the first guide rail 313 in the axial direction of the first compression roller 221. By means of adjusting the position of the base 311 on the first guide rail 313, the cutting width of the cutting mechanism 310 can be adjusted.

The first guide rail 313 may be provided with one base 311, and may also be provided with two bases 311, and the two bases 311 are disposed at intervals in the axial direction of the first compression roller 221, so as to cut the two sides of the membrane in the width direction.

In addition, the edge trimming apparatus 300 may further include a removal mechanism 320, the removal mechanism 320 and the cutting mechanism 310 are distributed at intervals in the circumferential direction of the first compression roller 221, as shown in FIG. 17, the removal mechanism 320 may include a blade 321, and the blade 321 is in contact with the first compression roller 221 along the axial line thereof, so as to peel off the cut edge adhered to the first compression roller 221.

Corresponding to the cutting mechanism 310, the removal mechanism 320 may include a second guide rail 322 and a blade 321, the blade 321 is movably installed, by means of a mounting seat, on the second guide rail 322 in the axial direction of the first compression roller 221, a second size measuring member 323 may also be disposed on the second guide rail 322, and the second size measuring member 323 is disposed on the second guide rail 322 in the axial direction of the first compression roller 221, so as to accurately adjust the position of the blade 321.

Of course, based on the implementation form that "the first guide rail 313 is provided with two bases 311", two blades 321 may also be installed on the second guide rail 322, the two blades 321 are disposed at intervals in the axial direction of the first compression roller 221, and the two blades 321 are in one-to-one correspondence with the two hobbing cutters 312, so as to cut and remove the edges on the two sides of the membrane in the width direction.

Figure 18:
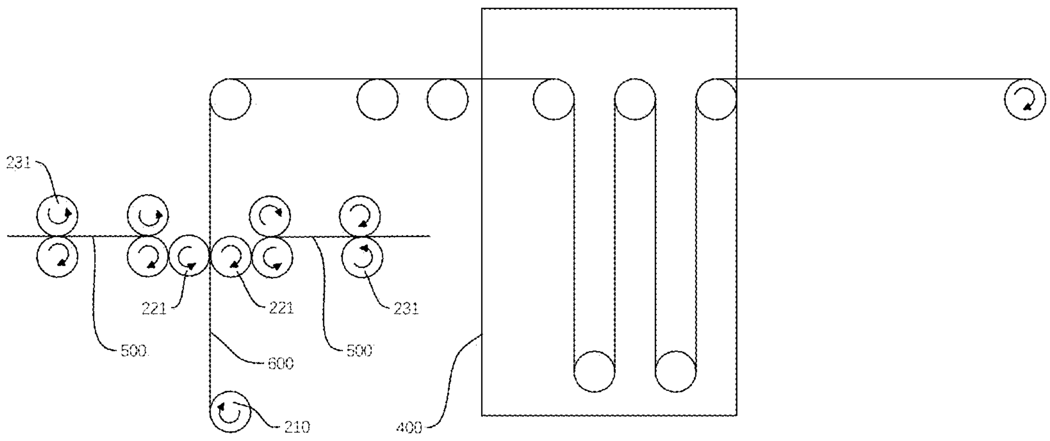
FIG. 18 is a schematic diagram of a simple structure of a double-side coated electrode sheet manufacturing device provided in some embodiments of the present application.

In some embodiments, referring to FIG. 14 and further referring to FIG. 18, FIG. 18 is a schematic diagram of a simple structure of a double-side coated electrode sheet manufacturing device provided in some embodiments of the present application. The electrode sheet manufacturing device 1000 may further be a double-side coated structure, and specifically, the electrode sheet manufacturing device 1000 may include two membrane preparation apparatuses 100, the compounding apparatus 200 may include two rolling mechanisms 220, based on the implementation form that "the rolling mechanism 220 includes three first compression rollers 221 which are disposed in sequence", the two rolling mechanisms 220 may be disposed opposite to each other, the two rolling mechanisms 220 are in one-to-one correspondence with the two membrane preparation apparatuses 100, rolling gaps are formed between the No. 1 first compression roller 221 and the second compression roller 221, and between the second compression roller 221 and the third compression roller 221 of each rolling mechanism 220, and a compounding gap is formed between the third compression rollers 221 of the two rolling mechanisms 220, so as to compound membranes on the two surfaces of the base material 600 in the thickness direction.

In some embodiments, as shown in FIG. 14 or FIG. 18, the electrode sheet manufacturing device 1000 further includes a drying apparatus 400, and the drying apparatus 400 is disposed at the downstream of the compounding apparatus 200 for drying the electrode sheet.

The electrode sheet manufacturing device includes the membrane preparation apparatus 100 and the compounding apparatus 200 disposed at the downstream of the membrane preparation apparatus 100, the membrane preparation apparatus 100 directly and uniformly mixes the powder mixture and the solution, which are used for forming the active substance layer, and form the active substance membrane 500 in the extrusion molding mode, and the compounding apparatus 200 compounds the active substance membrane 500 with the base material 600 to obtain the electrode sheet. The overall electrode sheet manufacturing device 1000 has high integration, and effectively improves the production quality and production efficiency of the electrode sheet.

Figure 19:
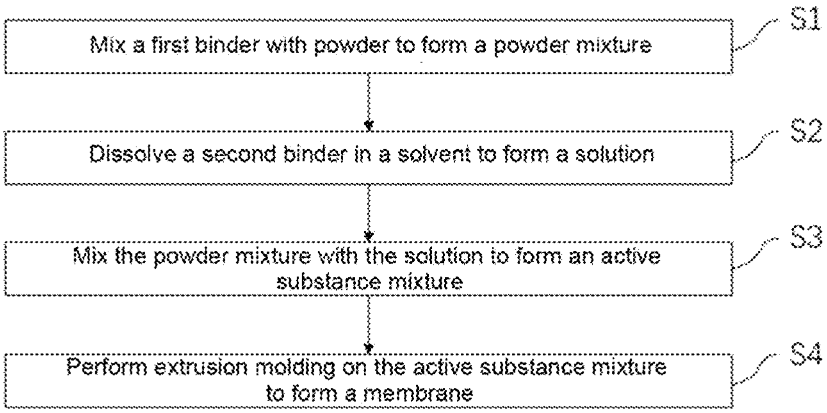
FIG. 19 is a schematic flowchart of a membrane preparation method provided in some embodiments of the present application.

Referring to FIG. 19, FIG. 19 is a schematic flowchart of a membrane preparation method provided in some embodiments of the present application. Some embodiments of the present application provide a membrane preparation method, mainly including:

S1: mixing a first binder with powder to form a powder mixture.

In the present embodiment, the powder refers to powder used for preparing an active substance layer, and the powder may include an electrode active substance, a conductive agent and the like. The first binder may be a fibrotic binder which is not easy to dissolve in the solution, so as to increase the structural strength of the active substance mixture, so that the active substance mixture forms a rib-net structure, for example, polytetrafluoroethylene, etc.

S2: dissolving a second binder in a solvent to form a solution.

In the present embodiment, the second binder may be mainly used for increasing the flexibility and cohesiveness of the active substance mixture, and the second binder may be polyvinylidene fluoride or the like, and the solvent forming the solution may include micromolecular alcohols or esters.

S3: mixing the powder mixture with the solution to form the active substance mixture.

The powder mixture and the solution form a clustered active substance mixture having certain viscosity, flexibility, extensibility and plasticity under the action of kneading, shearing, stirring and other acting forces, so as to facilitate the subsequent formation of a membrane having a self-supporting structure under the action of an extrusion force.

S4: performing extrusion molding on the active substance mixture to form a membrane.

An extrusion force is applied to the clustered active substance mixture formed by mixing, and under the constraint of the extrusion die head 40 or other shaping structures, the active substance mixture is extruded and formed into a strip-shaped membrane of a three-dimensional mechanism.

Referring to FIG. 1 to FIG. 9, some embodiments of the present application provide a membrane preparation apparatus 100, the membrane preparation apparatus 100 includes a mixing mechanism 10, a first feeding mechanism 20, a second feeding mechanism 30 and an extrusion die head 40, wherein the first feeding mechanism 20 is used for adding, into the mixing mechanism 10, a powder mixture containing powder and a first binder; the second feeding mechanism 30 is used for adding, into the mixing mechanism 10, a solution dissolved with a second binder; the mixing mechanism 10 is used for mixing the powder mixture with the solution; and the extrusion die head 40 is connected to a discharge end of the mixing mechanism 10 and is used for forming a membrane in an extrusion molding mode.

The mixing mechanism 10 is a twin-screw machine, the first feeding mechanism 20 is a weightlessness scale, the second feeding mechanism 30 is a metering pump, the weightless scale is disposed at the upstream of the metering pump in the conveying direction of the screw 11 of the twin-screw machine, and the extrusion die head 40 is directly installed on the discharge end of the twin-screw machine.

The screw 11 of the twin-screw machine is formed by alternately arranging an internal mixing rotor element 114 and a thread conveying element, wherein the thread conveying element includes a first thread conveying element 111, a second thread conveying element 112 and a third thread conveying element 113. The screw 11 includes a plurality of groups of internal mixing rotor conveying assemblies, each group of internal mixing rotor conveying assemblies includes two internal mixing rotor elements 114 and one second thread conveying element 112, which are sequentially disposed in the conveying direction of the screw 11, the second thread conveying element 112 is directly connected with the internal mixing rotor elements 114, and the two internal mixing rotor elements 114 are in mirror symmetry connection with each other along the axis of the screw 11.

The screw 11 includes six first thread conveying elements 111, three groups of internal mixing rotor conveying assemblies, three first thread conveying elements 111, two groups of internal mixing rotor conveying assemblies, four first thread conveying elements 111, one second thread conveying element 112 and four third thread conveying elements 113, which are sequentially disposed in the conveying direction of the screw 11.

The outer diameter of the screw 11 is D, the screw pitch of the first thread conveying element 111 is L1, the screw pitch of the second thread conveying element 112 is L2, the screw pitch of the third thread conveying element 113 is L3, the width of a screw edge 1141 of the internal mixing rotor element 114 is d, the helical angle of the screw edge 1141 of the internal mixing rotor element 114 is θ, and the depths of thread grooves of the first thread conveying element 111, the second thread conveying element 112 and the third thread conveying element 113 are all H, and the following expressions are met:

L1=1.0 D, L2=0.6 D, L3=0.4 D, H=0.13 D, d=0.06 D and R=120°.

It should be noted that, in the case of no conflict, the features in the embodiments of the present application may be combined with each other.

Although the present application has been described with reference to some embodiments, various modifications may be made thereto and components therein may be replaced with equivalents without departing from the scope of the present application. In particular, as long as there is no structural conflict, various technical features mentioned in various embodiments may be combined in any manner. The present application is not limited to the specific embodiments disclosed herein, but includes all technical solutions falling within the scope of the claims.

What is claimed is:

1. A membrane preparation apparatus, comprising:
a mixing mechanism;
a first feeding mechanism;
a second feeding mechanism; and an extrusion die head;
wherein:
- the first feeding mechanism is configured for adding, into the mixing mechanism, a powder mixture containing powder and a first binder;
- the second feeding mechanism is configured for adding, into the mixing mechanism, a solution dissolved with a second binder;
- the mixing mechanism is configured for mixing the powder mixture with the solution;
- the extrusion die head is connected to a discharge end of the mixing mechanism and is configured for forming a membrane in an extrusion molding mode; and
- the first binder is a fibrotic binder that is not easy to dissolve in a solvent or poor in solubility in the solvent, and the second binder is soluble in a solvent.

2. The membrane preparation apparatus according to claim 1, wherein the extrusion die head is directly connected with the discharge end of the mixing mechanism.

3. The membrane preparation apparatus according to claim 1, wherein the mixing mechanism is a twin-screw machine.

4. The membrane preparation apparatus according to claim 3, wherein a screw of the twin-screw machine is formed by alternately arranging an internal mixing rotor element and a thread conveying element.

5. The membrane preparation apparatus according to claim 4, wherein a width d of a screw edge of the internal mixing rotor element and an outer diameter D of the screw satisfy 0.02D≤d≤0.15D.

6. The membrane preparation apparatus according to claim 4, wherein a helical angle θ of a screw edge of the internal mixing rotor element satisfies 90°≤θ≤150°.

7. The membrane preparation apparatus according to claim 4, wherein the thread conveying element comprises a first thread conveying element and a second thread conveying element, an outer diameter D of the screw, a screw pitch L1 of the first thread conveying element, and a screw pitch L2 of the second thread conveying element satisfy $0.8D \leq L1 \leq 1.2D$.

8. The membrane preparation apparatus according to claim 7, wherein $0.9D \leq L1 \leq 1.1D$ and $0.6D \leq L2 \leq 0.7D$.

9. The membrane preparation apparatus according to claim 7, wherein the screw comprises a plurality of groups of internal mixing rotor conveying assemblies, and each group of internal mixing rotor conveying assemblies comprises two internal mixing rotor elements and one second thread conveying element, which are sequentially disposed in a conveying direction of the screw, wherein the second thread conveying element is directly connected with the internal mixing rotor elements, and the two internal mixing rotor elements are in mirror symmetry connection with each other along an axis of the screw.

10. The membrane preparation apparatus according to claim 7, wherein the thread conveying element further comprises a third thread conveying element, wherein a screw pitch L3 of the third thread conveying element satisfies $0.2D \leq L3 \leq 0.5D$.

11. The membrane preparation apparatus according to claim 10, wherein the screw comprises a first thread conveying element, an internal mixing rotor conveying assembly, a first thread conveying element, an internal mixing rotor conveying assembly, a first thread conveying element, a second thread conveying element and a third thread conveying element, which are sequentially disposed in a conveying direction of the screw.

12. The membrane preparation apparatus according to claim 4, wherein a depth H of a thread groove of the thread conveying element and an outer diameter D of the screw satisfy $0.1D \leq H \leq 0.15D$.

13. The membrane preparation apparatus according to claim 3, wherein the twin-screw machine comprises a cylinder and a screw, the screw is rotatably disposed in the cylinder, and a gap L4 between an outer circumferential surface of the screw and an inner wall of the cylinder satisfies $0.1\ \text{mm} \leq L4 \leq 0.6\ \text{mm}$.

14. The membrane preparation apparatus according to claim 3, wherein in a conveying direction of the screw, the first feeding mechanism is located at upstream of the second feeding mechanism.

15. The membrane preparation apparatus according to claim 1, wherein the first feeding mechanism is a weightlessness scale.

16. The membrane preparation apparatus according to claim 1, wherein the second feeding mechanism is a metering pump.

17. The membrane preparation apparatus according to claim 1, wherein the extrusion die head comprises a die head body and a flow equalizing plate, the die head body is provided with a feed port, a discharge port and a material cavity for communicating the feed port with the discharge port, the flow equalizing plate is disposed in the material cavity, the flow equalizing plate divides the material cavity into a first cavity communicating with the feed port and a second cavity communicating with the discharge port, the flow equalizing plate is provided with a plurality of through holes, and the plurality of through holes communicate with the first cavity and the second cavity.

18. The membrane preparation apparatus according to claim 17, wherein in a length direction of the discharge port, diameters of the through holes gradually increase from a middle of the flow equalizing plate to two sides.

19. An electrode sheet manufacturing device, comprising:

the membrane preparation apparatus according to claim 1, wherein the membrane preparation apparatus is configured for forming a membrane in an extrusion molding mode; and a compounding apparatus, disposed at downstream of the membrane preparation apparatus, wherein the compounding apparatus is configured for compounding a base material with the membrane to form an electrode sheet.

* * * * *